US009633033B2

United States Patent
Vijayan et al.

(10) Patent No.: US 9,633,033 B2
(45) Date of Patent: Apr. 25, 2017

(54) HIGH AVAILABILITY DISTRIBUTED DEDUPLICATED STORAGE SYSTEM

(71) Applicant: CommVault Systems, Inc., Oceanport, NJ (US)

(72) Inventors: Manoj Kumar Vijayan, Marlboro, NJ (US); Jaidev Oppath Kochunni, Eatontown, NJ (US); Saurabh Agrawal, Ocean, NJ (US); Abhishek Narulkar, Ocean, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 559 days.

(21) Appl. No.: 14/152,509

(22) Filed: Jan. 10, 2014

(65) Prior Publication Data

US 2014/0201170 A1    Jul. 17, 2014

Related U.S. Application Data

(60) Provisional application No. 61/751,699, filed on Jan. 11, 2013.

(51) Int. Cl.
G06F 17/30    (2006.01)

(52) U.S. Cl.
CPC .............................. *G06F 17/30156* (2013.01)

(58) Field of Classification Search
None
See application file for complete search history.

(56) References Cited

U.S. PATENT DOCUMENTS

| | | |
|---|---|---|
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |

(Continued)

FOREIGN PATENT DOCUMENTS

| | | |
|---|---|---|
| EP | 0259912 | 3/1988 |
| EP | 0405926 | 1/1991 |

(Continued)

OTHER PUBLICATIONS

Armstead et al., "Implementation of a Campus-Wide Distributed Mass Storage Service: The Dream vs. Reality," IEEE, 1995, pp. 190-199.

(Continued)

*Primary Examiner* — Tyler Torgrimson
(74) *Attorney, Agent, or Firm* — Knobbe, Martens, Olson & Bear, LLP

(57) ABSTRACT

A high availability distributed, deduplicated storage system according to certain embodiments is arranged to include multiple deduplication database media agents. The deduplication database media agents store signatures of data blocks stored in secondary storage. In addition, the deduplication database media agents are configured as failover deduplication database media agents in the event that one of the deduplication database media agents becomes unavailable.

12 Claims, 14 Drawing Sheets

(56) References Cited

U.S. PATENT DOCUMENTS

| | | |
|---|---|---|
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,499,367 A | 3/1996 | Bamford et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,625,793 A | 4/1997 | Mirza |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,732,240 A | 3/1998 | Caccavale |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,765,173 A | 6/1998 | Cane et al. |
| 5,778,395 A | 7/1998 | Whiting et al. |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,940,833 A | 8/1999 | Benson |
| 5,950,205 A | 9/1999 | Aviani, Jr. |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,286,084 B1 | 9/2001 | Wexler et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,425,057 B1 | 7/2002 | Cherkasova et al. |
| 6,487,561 B1 | 11/2002 | Ofek et al. |
| 6,496,850 B1 | 12/2002 | Bowman-Amuah |
| 6,519,679 B2 | 2/2003 | Devireddy et al. |
| 6,538,669 B1 | 3/2003 | Lagueux, Jr. et al. |
| 6,557,030 B1 | 4/2003 | Hoang |
| 6,564,228 B1 | 5/2003 | O'Connor |
| 6,658,526 B2 | 12/2003 | Nguyen et al. |
| 6,704,730 B2 | 3/2004 | Moulton et al. |
| 6,757,794 B2 | 6/2004 | Cabrera et al. |
| 6,760,812 B1 | 7/2004 | Degenaro et al. |
| 6,810,398 B2 | 10/2004 | Moulton |
| 6,823,377 B1 | 11/2004 | Wu et al. |
| 6,865,655 B1 | 3/2005 | Andersen |
| 6,952,758 B2 | 10/2005 | Chron et al. |
| 7,028,096 B1 | 4/2006 | Lee |
| 7,065,619 B1 | 6/2006 | Zhu et al. |
| 7,085,904 B2 | 8/2006 | Mizuno et al. |
| 7,103,617 B2 | 9/2006 | Phatak |
| 7,117,246 B2 | 10/2006 | Christenson et al. |
| 7,143,091 B2 | 11/2006 | Charnock |
| 7,243,163 B1 | 7/2007 | Friend et al. |
| 7,246,272 B2 | 7/2007 | Cabezas et al. |
| 7,272,606 B2 | 9/2007 | Borthakur et al. |
| 7,284,030 B2 | 10/2007 | Ackaouy et al. |
| 7,287,252 B2 | 10/2007 | Bussiere et al. |
| 7,383,462 B2 | 6/2008 | Osaki et al. |
| 7,437,388 B1 | 10/2008 | DeVos |
| 7,472,242 B1 | 12/2008 | Deshmukh et al. |
| 7,490,207 B2 | 2/2009 | Amarendran et al. |
| 7,516,186 B1 | 4/2009 | Borghetti et al. |
| 7,519,726 B2 | 4/2009 | Palliyil et al. |
| 7,539,710 B1 | 5/2009 | Haustein et al. |
| 7,568,080 B2 | 7/2009 | Prahlad et al. |
| 7,581,077 B2 | 8/2009 | Ignatius et al. |
| 7,584,338 B1 | 9/2009 | Bricker et al. |
| 7,613,748 B2 | 11/2009 | Brockway et al. |
| 7,631,194 B2 | 12/2009 | Wahlert et al. |
| 7,657,550 B2 | 2/2010 | Prahlad et al. |
| 7,685,126 B2 | 3/2010 | Patel et al. |
| 7,720,841 B2 | 5/2010 | Gu et al. |
| 7,734,820 B1 | 6/2010 | Ranade et al. |
| 7,747,579 B2 | 6/2010 | Prahlad et al. |
| 7,761,425 B1 | 7/2010 | Erickson et al. |
| 7,797,279 B1 | 9/2010 | Starling et al. |
| 7,814,149 B1 | 10/2010 | Stringham |
| 7,822,939 B1 | 10/2010 | Veprinsky et al. |
| 7,827,150 B1 | 11/2010 | Wu et al. |
| 7,831,795 B2 | 11/2010 | Prahlad et al. |
| 8,074,043 B1 | 12/2011 | Zeis |
| 8,145,614 B1 | 3/2012 | Zimran et al. |
| 8,200,923 B1 | 6/2012 | Healey et al. |
| 8,204,862 B1 | 6/2012 | Paulzagade et al. |
| 8,209,334 B1 | 6/2012 | Doerner |
| 8,261,240 B2 | 9/2012 | Hoban |
| 8,280,854 B1 | 10/2012 | Emmert |
| 8,364,652 B2 | 1/2013 | Vijayan et al. |
| 8,484,162 B2 | 7/2013 | Prahlad et al. |
| 8,572,340 B2 | 10/2013 | Vijayan et al. |
| 8,577,851 B2 | 11/2013 | Vijayan et al. |
| 8,578,109 B2 | 11/2013 | Vijayan et al. |
| 8,621,240 B1 | 12/2013 | Auchmoody et al. |
| 8,930,306 B1 | 1/2015 | Ngo et al. |
| 8,954,446 B2 | 2/2015 | Retnamma et al. |
| 9,020,900 B2 | 4/2015 | Retnamma et al. |
| 9,104,623 B2 | 8/2015 | Retnamma et al. |
| 9,110,602 B2 | 8/2015 | Vijayan et al. |
| 9,116,850 B2 | 8/2015 | Vijayan Retnamma et al. |
| 9,218,374 B2 | 12/2015 | Muller et al. |
| 9,218,375 B2 | 12/2015 | Muller et al. |
| 9,218,376 B2 | 12/2015 | Muller et al. |
| 9,239,687 B2 | 1/2016 | Vijayan et al. |
| 9,251,186 B2 | 2/2016 | Muller et al. |
| 9,405,763 B2 | 8/2016 | Prahlad et al. |
| 2001/0052015 A1 | 12/2001 | Lin et al. |
| 2002/0062439 A1 | 5/2002 | Cotugno et al. |
| 2002/0107877 A1 | 8/2002 | Whiting et al. |
| 2002/0133601 A1* | 9/2002 | Kennamer .......... H04L 67/1034 709/229 |
| 2002/0143892 A1 | 10/2002 | Mogul |
| 2002/0144250 A1 | 10/2002 | Yen |
| 2002/0169934 A1 | 11/2002 | Krapp et al. |
| 2003/0033308 A1 | 2/2003 | Patel et al. |
| 2003/0115346 A1 | 6/2003 | McHenry et al. |
| 2003/0172130 A1 | 9/2003 | Fruchtman et al. |
| 2003/0174648 A1 | 9/2003 | Wang et al. |

(56) References Cited

U.S. PATENT DOCUMENTS

| | | |
|---|---|---|
| 2003/0187917 A1 | 10/2003 | Cohen |
| 2003/0188106 A1 | 10/2003 | Cohen |
| 2004/0010562 A1 | 1/2004 | Itonaga |
| 2004/0148306 A1 | 7/2004 | Moulton et al. |
| 2004/0181519 A1 | 9/2004 | Anwar |
| 2004/0215746 A1 | 10/2004 | McCanne et al. |
| 2004/0230753 A1 | 11/2004 | Amiri et al. |
| 2005/0033756 A1 | 2/2005 | Kottomtharayil et al. |
| 2005/0060643 A1 | 3/2005 | Glass et al. |
| 2005/0117558 A1 | 6/2005 | Angermann et al. |
| 2005/0204108 A1 | 9/2005 | Ofek et al. |
| 2005/0216659 A1 | 9/2005 | Ogawa et al. |
| 2005/0243609 A1 | 11/2005 | Yang et al. |
| 2005/0246393 A1 | 11/2005 | Coates et al. |
| 2005/0268068 A1 | 12/2005 | Ignatius et al. |
| 2005/0273654 A1 | 12/2005 | Chen et al. |
| 2006/0004808 A1 | 1/2006 | Hsu et al. |
| 2006/0010227 A1 | 1/2006 | Atluri |
| 2006/0020660 A1 | 1/2006 | Prasad et al. |
| 2006/0064456 A1 | 3/2006 | Kalthoff et al. |
| 2006/0095527 A1 | 5/2006 | Malik |
| 2006/0101096 A1 | 5/2006 | Fuerst |
| 2006/0167900 A1 | 7/2006 | Pingte et al. |
| 2006/0168318 A1 | 7/2006 | Twiss |
| 2006/0179405 A1 | 8/2006 | Chao et al. |
| 2006/0224846 A1 | 10/2006 | Amarendran et al. |
| 2007/0043757 A1 | 2/2007 | Benton et al. |
| 2007/0073814 A1 | 3/2007 | Kamat et al. |
| 2007/0156966 A1 | 7/2007 | Sundarrajan et al. |
| 2007/0162462 A1 | 7/2007 | Zhang et al. |
| 2007/0179990 A1 | 8/2007 | Zimran et al. |
| 2007/0179995 A1 | 8/2007 | Prahlad et al. |
| 2007/0192444 A1 | 8/2007 | Ackaouy et al. |
| 2007/0192542 A1 | 8/2007 | Frolund et al. |
| 2007/0192544 A1 | 8/2007 | Frolund et al. |
| 2007/0203937 A1 | 8/2007 | Prahlad et al. |
| 2007/0250670 A1 | 10/2007 | Fineberg et al. |
| 2007/0255758 A1 | 11/2007 | Zheng et al. |
| 2008/0005141 A1 | 1/2008 | Zheng et al. |
| 2008/0005509 A1 | 1/2008 | Smith et al. |
| 2008/0016131 A1 | 1/2008 | Sandorfi et al. |
| 2008/0028149 A1 | 1/2008 | Pardikar et al. |
| 2008/0089342 A1 | 4/2008 | Lansing et al. |
| 2008/0091655 A1 | 4/2008 | Gokhale et al. |
| 2008/0091725 A1 | 4/2008 | Hwang et al. |
| 2008/0098041 A1 | 4/2008 | Chidambaran et al. |
| 2008/0133561 A1 | 6/2008 | Dubnicki et al. |
| 2008/0159331 A1 | 7/2008 | Mace et al. |
| 2008/0229037 A1 | 9/2008 | Bunte et al. |
| 2008/0243879 A1 | 10/2008 | Gokhale et al. |
| 2008/0243914 A1 | 10/2008 | Prahlad et al. |
| 2008/0243953 A1 | 10/2008 | Wu et al. |
| 2008/0243957 A1 | 10/2008 | Prahlad et al. |
| 2008/0243958 A1 | 10/2008 | Prahlad et al. |
| 2008/0244172 A1 | 10/2008 | Kano |
| 2008/0244199 A1 | 10/2008 | Nakamura et al. |
| 2008/0244204 A1 | 10/2008 | Cremelie et al. |
| 2008/0250204 A1 | 10/2008 | Kavuri et al. |
| 2008/0256431 A1 | 10/2008 | Hornberger |
| 2008/0281908 A1 | 11/2008 | McCanne et al. |
| 2008/0294660 A1 | 11/2008 | Patterson et al. |
| 2008/0294696 A1 | 11/2008 | Frandzel |
| 2008/0320151 A1 | 12/2008 | McCanne et al. |
| 2009/0013129 A1 | 1/2009 | Bondurant |
| 2009/0043767 A1 | 2/2009 | Joshi et al. |
| 2009/0055425 A1 | 2/2009 | Evans et al. |
| 2009/0055471 A1 | 2/2009 | Kozat et al. |
| 2009/0077140 A1 | 3/2009 | Anglin et al. |
| 2009/0138481 A1 | 5/2009 | Chatley et al. |
| 2009/0144416 A1 | 6/2009 | Chatley et al. |
| 2009/0144422 A1 | 6/2009 | Chatley et al. |
| 2009/0171888 A1 | 7/2009 | Anglin |
| 2009/0172139 A1 | 7/2009 | Wong et al. |
| 2009/0183162 A1 | 7/2009 | Kindel et al. |
| 2009/0204636 A1 | 8/2009 | Li et al. |
| 2009/0204649 A1 | 8/2009 | Wong et al. |
| 2009/0210431 A1 | 8/2009 | Marinkovic et al. |
| 2009/0254507 A1 | 10/2009 | Hosoya et al. |
| 2009/0268903 A1 | 10/2009 | Bojinov et al. |
| 2009/0271454 A1 | 10/2009 | Anglin et al. |
| 2009/0276454 A1 | 11/2009 | Smith |
| 2009/0307251 A1 | 12/2009 | Heller et al. |
| 2009/0319534 A1 | 12/2009 | Gokhale |
| 2009/0319585 A1 | 12/2009 | Gokhale |
| 2009/0327625 A1 | 12/2009 | Jaquette et al. |
| 2010/0005259 A1 | 1/2010 | Prahlad et al. |
| 2010/0036887 A1 | 2/2010 | Anglin et al. |
| 2010/0042790 A1 | 2/2010 | Mondal et al. |
| 2010/0070478 A1 | 3/2010 | Anglin |
| 2010/0077161 A1 | 3/2010 | Stoakes et al. |
| 2010/0082558 A1 | 4/2010 | Anglin et al. |
| 2010/0082672 A1 | 4/2010 | Kottomtharayil et al. |
| 2010/0088296 A1 | 4/2010 | Periyagaram et al. |
| 2010/0094817 A1 | 4/2010 | Ben-Shaul et al. |
| 2010/0114833 A1 | 5/2010 | Mu |
| 2010/0169287 A1 | 7/2010 | Klose |
| 2010/0180075 A1 | 7/2010 | McCloskey et al. |
| 2010/0250549 A1 | 9/2010 | Muller et al. |
| 2010/0250896 A1 | 9/2010 | Matze |
| 2010/0257142 A1 | 10/2010 | Murphy et al. |
| 2010/0257346 A1 | 10/2010 | Sosnosky et al. |
| 2010/0299490 A1 | 11/2010 | Attarde et al. |
| 2010/0312752 A1 | 12/2010 | Zeis et al. |
| 2010/0318759 A1 | 12/2010 | Hamilton et al. |
| 2011/0060940 A1 | 3/2011 | Taylor et al. |
| 2011/0113013 A1 | 5/2011 | Reddy et al. |
| 2011/0113016 A1 | 5/2011 | Gruhl et al. |
| 2011/0119741 A1 | 5/2011 | Kelly et al. |
| 2011/0161723 A1 | 6/2011 | Taleck et al. |
| 2011/0258161 A1 | 10/2011 | Constantinescu et al. |
| 2011/0276543 A1 | 11/2011 | Matze |
| 2011/0289281 A1 | 11/2011 | Spackman |
| 2011/0302140 A1 | 12/2011 | Gokhale et al. |
| 2011/0314070 A1 | 12/2011 | Brown et al. |
| 2011/0314400 A1 | 12/2011 | Mital et al. |
| 2012/0011101 A1 | 1/2012 | Fang et al. |
| 2012/0016839 A1 | 1/2012 | Yueh |
| 2012/0078881 A1 | 3/2012 | Crump et al. |
| 2012/0089574 A1 | 4/2012 | Doerner |
| 2012/0150814 A1 | 6/2012 | Retnamma et al. |
| 2012/0150817 A1 | 6/2012 | Retnamma et al. |
| 2012/0150818 A1 | 6/2012 | Retnamma et al. |
| 2012/0150826 A1 | 6/2012 | Retnamma et al. |
| 2012/0150949 A1 | 6/2012 | Retnamma et al. |
| 2012/0166403 A1* | 6/2012 | Kim .................. G06F 17/30156 707/692 |
| 2012/0233417 A1 | 9/2012 | Kalach |
| 2012/0303622 A1 | 11/2012 | Dean et al. |
| 2013/0232309 A1 | 9/2013 | Vijayan et al. |
| 2013/0290280 A1 | 10/2013 | Prahlad et al. |
| 2013/0339298 A1 | 12/2013 | Muller et al. |
| 2013/0339299 A1 | 12/2013 | Muller et al. |
| 2013/0339300 A1 | 12/2013 | Muller et al. |
| 2013/0339310 A1 | 12/2013 | Muller et al. |
| 2013/0339390 A1 | 12/2013 | Muller et al. |
| 2013/0346373 A1 | 12/2013 | Muller et al. |
| 2014/0032864 A1 | 1/2014 | Vijayan et al. |
| 2014/0201171 A1 | 7/2014 | Vijayan et al. |
| 2015/0012698 A1 | 1/2015 | Bolla et al. |
| 2015/0154220 A1 | 6/2015 | Ngo et al. |
| 2015/0261776 A1 | 9/2015 | Attarde et al. |
| 2015/0261792 A1 | 9/2015 | Attarde et al. |
| 2016/0042007 A1 | 2/2016 | Vijayan et al. |
| 2016/0188416 A1 | 6/2016 | Muller et al. |
| 2016/0196070 A1 | 7/2016 | Vijayan et al. |
| 2016/0266828 A1 | 9/2016 | Vijayan et al. |
| 2016/0266980 A1 | 9/2016 | Muller et al. |
| 2016/0306708 A1 | 10/2016 | Prahlad et al. |

FOREIGN PATENT DOCUMENTS

| | | |
|---|---|---|
| EP | 0467546 | 1/1992 |
| EP | 0774715 | 5/1997 |
| EP | 0809184 | 11/1997 |

(56) References Cited

FOREIGN PATENT DOCUMENTS

| EP | 0899662 | 3/1999 |
|---|---|---|
| EP | 0981090 | 2/2000 |
| WO | WO 95/13580 | 5/1995 |
| WO | WO 99/09480 A1 | 2/1999 |
| WO | WO 99/12098 | 3/1999 |
| WO | WO 2010/013292 A1 | 2/2010 |
| WO | WO 2012/044366 | 4/2012 |
| WO | WO 2012/044367 | 4/2012 |
| WO | WO 2013/188550 | 12/2013 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Cohen, Edith, et al.,. "The Age Penalty and Its Effect on Cache Performance." In USITS, pp. 73-84. 2001.
Cohen, Edith, et al.,."Aging through cascaded caches: Performance issues in the distribution of web content." In ACM SIGCOMM Computer Communication Review, vol. 31, No. 4, pp. 41-53. ACM, 2001.
Cohen, Edith, et al.,. "Refreshment policies for web content caches." Computer Networks 38.6 (2002): 795-808.
CommVault Systems, Inc. "Continuous Data Replicator 7.0," Product Data Sheet, 2007.
CommVault Systems, Inc., "Deduplication—How To," http://documentation.commvault.com/commvault/release_8_0_0/books_online_1/english_US/features/single_instance/single_instance_how_to.htm, internet accessed on Jan. 26, 2009, 7 pages.
CommVault Systems, Inc., "Deduplication," http://documentation.commvault.com/commvault/release_8_0_0/books_online_1/english_US/features/single_instance/single_instance.htm, internet accessed on Jan. 26, 2009, 9 pages.
Diligent Technologies HyperFactor, http://www.dilligent.com/products:protecTIER-1:HyperFactor-1, Internet accessed on Dec. 5, 2008, 2 pages.
Eitel, "Backup and Storage Management in Distributed Heterogeneous Environments," IEEE, 1994, pp. 124-126.
Gait, "The Optical File Cabinet: A Random-Access File system for Write-Once Optical Disks," IEEE Computer, vol. 21, No. 6, pp. 11-22 (1988).
Jander, "Launching Storage-Area Net," Data Communications, US, McGraw Hill, NY, vol. 27, No. 4(Mar. 21, 1998), pp. 64-72.
Kornblum, Jesse, "Identifying Almost Identical Files Using Context Triggered Piecewise Hashing," www.sciencedirect.com, Digital Investigation 3S (2006), pp. S91-S97.
Lortu Software Development, "Kondar Technology-Deduplication," http://www.lortu.com/en/deduplication.asp, Internet accessed on Dec. 5, 2008, 3 pages.
Overland Storage, "Data Deduplication," http://www.overlandstorage.com/topics/data_deduplication.html, Internet accessed on Dec. 5, 2008, 2 pages.
Quantum Corporation, "Data De-Duplication Background: A Technical White Paper," May 2008, 13 pages.
Rosenblum et al., "The Design and Implementation of a Log-Structure File System," Operating Systems Review SIGOPS, vol. 25, No. 5, New York, US, pp. 1-15 (May 1991).
Bhagwat, Extreme Binning: Scalable, Parallel Deduplication for Chunk-based File Backup. IEEE 2009, 9 pages.
Dubnicki, et al. "HYDRAstor: A Scalable Secondary Storage." FAST. vol. 9.2009, 74 pages.
Wei, et al. "MAD2: A scalable high-throughput exact deduplication approach for network backup services." Mass Storage Systems and Technologies (MSST), 2010 IEEE 26th Symposium on. IEEE, 2010, 14 pages.
Wolman et al., On the scale and performance of cooperative Web proxy caching, 1999, 16 pages.
Wu, et al., Load Balancing and Hot Spot Relief for Hash Routing among a Collection of Proxy Caches, 1999, 16 pages.
International Search Report and Written Opinion, International Application No. PCT/US2009/58137, Mail Date Dec. 23, 2009, 9 pages.
International Search Report and Written Opinion, International Application No. PCT/US2011/030804, mailed Jun. 9, 2011, 16 pages.
International Search Report and Written Opinion, International Application No. PCT/US2011/030814, mailed Jun. 9, 2011, 15 pages.
International Search Report and Written Opinion, International Application No. PCT/US2013/045443 mailed Nov. 14, 2013, 19 pages.
International Preliminary Report on Patentability, International Application No. PCT/US2013/045443 mailed Dec. 16, 2014 11 pages.

* cited by examiner

| stream header 172 | stream data 174 | stream header 172 | stream data 174 | stream header 172 | stream data 174 |
|---|---|---|---|---|---|
| Length: 63kb<br>Encrypted: -<br>Compressed: -<br>Archive File ID: -<br>Single-instanceable: Y<br>Block start: Y | data | Length: 63kb<br>Encrypted: -<br>Compressed: -<br>Archive File ID: -<br>Single-instanceable: Y<br>Block start: N | data | Length: 63kb<br>Encrypted: -<br>Compressed: -<br>Archive File ID: -<br>Single-instanceable: N<br>Start of block: N | data |

| 172 | 174 | 176 | 178 | 172 | 174 | 172 | 174 | 176 | 178 | 172 | 174 |
|---|---|---|---|---|---|---|---|---|---|---|---|
| L:63kb<br>BS:Y | data<br>(63kb) | I:Y | identifier data | L:1kb<br>BS:N | data<br>(1kb) | L:62kb<br>BS:Y | data<br>(62kb) | I:Y | identifier data | L:2kb<br>BS:N | data<br>(2kb) |

| 176 | 178 | 172 | 174 |
|---|---|---|---|
| I:Y | identifier data | L:63kb<br>BS:N | data |

. . .

HIGH AVAILABILITY DISTRIBUTED DEDUPLICATED STORAGE SYSTEM

PRIORITY CLAIM

The present application claims priority to U.S. Provisional App. No. 61/751,699, filed Jan. 11, 2013, entitled HIGH AVAILABILITY DISTRIBUTED DEDUPLICATED STORAGE SYSTEM, the entirety of which is incorporated herein by reference.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, and the like, are in increasing demand.

In response to these challenges, one technique developed by storage system providers is data deduplication. Deduplication typically involves eliminating or reducing the amount of redundant data stored and communicated within a storage system, improving storage utilization. For example, data can be divided into units of a chosen granularity (e.g., files or data blocks). As new data enters the system, the data units can be checked to see if they already exist in the storage system. If the data unit already exists, instead of storing and/or communicating a duplicate copy, the storage system stores and/or communicates a reference to the existing data segment.

SUMMARY

Deduplication can improve storage utilization, system traffic (e.g., over a networked storage system), or both. Deduplication techniques designed to reduce the demands on storage systems during storage operations such as backup and/or replication operations can be found in the following U.S. patent applications, each of which is incorporated by reference in its entirety. One or more embodiments of the present disclosure may be used with systems and methods disclosed therein:

U.S. patent application Ser. No. 12/982,100, entitled "Systems and Methods for Retaining and Using Block Signatures in Data Protection Operations," filed Dec. 30, 2010; and U.S. patent application Ser. No. 12/725,288, entitled "Extensible Data Deduplication System and Method," filed Mar. 16, 2010.

As the amount of data increases in systems employing deduplication, the amount of computational and storage overhead involved in managing the deduplication process can become quite significant. For example, as the amount of data increases, there is a corresponding increase in the number of deduplication data blocks (or other deduplication data units) to maintain. Moreover, such systems often calculate and store signatures (e.g., hashes of the data blocks) associated with each data block, which are used to identify and remove redundant data blocks, presenting further capacity and maintenance challenges.

In order to address such challenges, a deduplicated storage system is provided according to certain embodiments that distributes deduplicated data across multiple, networked media agents. As will be described in greater detail, the media agents can communicate with one another using a light-weight, customized communication scheme. Using multiple, distributed media agents for deduplication will generally be referred to as "parallel deduplication" throughout the disclosure.

In some cases, deduplication management information is stored separately from the deduplicated data, in separate, special purpose networked storage nodes, for example. The management information can include, without limitation, data block signatures and associated metadata, and mappings of deduplicated files including pointers to data blocks making up the respective files and/or data block location information. The management information can also be distributed across multiple management nodes (e.g., deduplication database media agents) in a manner similar to the deduplicated data. The distributed nature of the deduplicated data and/or management information enhances scalability, among providing other benefits.

In addition, to increase system availability and reduce the likelihood that a backup operation will fail, each of the special purpose networked storage nodes can act as a failover for another special purpose networked storage node. For example, if management information is evenly distributed across four nodes and one of the nodes becomes unavailable, another one of the four nodes can begin storing the management information that would have been stored in the unavailable node. If the failover node also becomes unavailable, one (or both) of the remaining two nodes can store the management information that would have been stored in the two unavailable nodes, etc.

DESCRIPTION OF THE DRAWINGS

FIGS. 1F-1H are block diagrams illustrating suitable data structures that may be employed by the information management system.

DETAILED DESCRIPTION

Overview

Figure 1A:
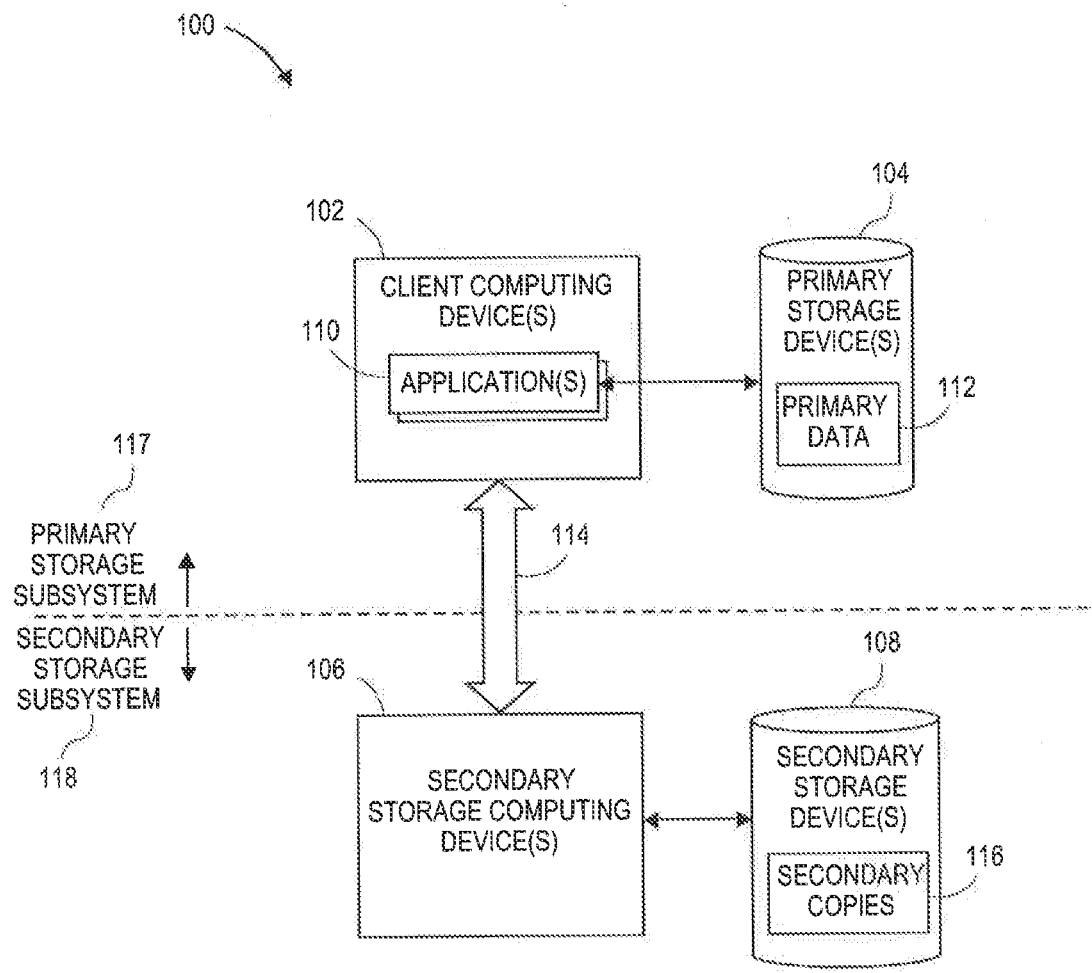
FIG. 1A is a block diagram illustrating an exemplary information management system.

Generally described, the present disclosure is directed to a system, method, and computer-readable non-transitory storage medium for storing data to and restoring data from a storage system including a deduplication database. Although various aspects of the disclosure will be described with regard to examples and embodiments, one skilled in the art will appreciate that the disclosed embodiments and examples should not be construed as limiting.

Each DDB media agent in the system can be assigned its own logical partition in a global deduplication database. Furthermore, the system can assign the different DDB media agents to store the signatures of different data blocks. For example, in some embodiments, the system can assign the DDB media agents to store signatures based on a modulo operation performed on the signature of each data block. As an example, and not to be construed as limiting, if there are four DDB media agents (DDB media agent1-DDB media agent4) and modulo 4 is used to assign the signatures to different DDB media agents, DDB media agent1 can store the signatures when the modulo operation results in a 0, DDB media agent2 can store the signatures that result in a 1, etc.

During a backup, the system determines the signature of each data block and queries the DDB media agent assigned to store the corresponding signature based on the modulo operation. If the signature is found, the system stores a link to a copy of the data block stored in secondary storage. If the signature is not found in the assigned DDB media agent, a copy of the data block is stored in secondary storage, and the signature and a link to the copy of the data block are stored in the assigned DDB media agent.

To increase system availability and reduce the likelihood that a backup operation will fail, each DDB media agent can act as a failover DDB media agent for another DDB media agent. With continued reference to the example given above, the DDB media agent1 can act as a failover for the DDB media agent4, the DDB media agent2 can act as the failover for the DDB media agent1, the DDB media agent3 for the DDB media agent2, and the DDB media agent4 for the DDB media agent3. Thus, if one of the DDB media agents (e.g., DDB media agent1) becomes unavailable (e.g., due to a network outage, power outage, hardware/software malfunction, scheduled maintenance, etc.), the system can use the assigned failover DDB media agent (e.g., DDB media agent2) to store signatures that are assigned to be stored in the unavailable DDB media agent (DDB media agent1) and to verify whether data blocks are already stored in secondary storage.

In addition, if DDB media agent2 becomes unavailable as well, its assigned failover DDB media agent (e.g., DDB media agent3) can store the signatures for the two unavailable DDB media agents (DDB media agent1 and DDB media agent2) and so on. The system can also use the failover DDB media agents for database pruning. Accordingly, the system can remain available for backup operations despite the unavailability of one or more DDB media agents.

Furthermore, once the unavailable DDB media agent becomes available, the system can continue to refer to the failover DDB media agent for the signatures that were stored there while the other DDB media agent was unavailable. With continued reference to the example given above, the system can track the signatures stored in DDB media agent2 as a result of the unavailability of DDB media agent1. Thus, even when DDB media agent1 becomes available, the system can continue to refer to DDB media agent2 for the signatures stored thereon while DDB media agent1 was unavailable. For new signatures and signatures stored on DDB media agent1 previously, the system can refer to DDB media agent1.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

- U.S. Pat. No. 8,285,681, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";
- U.S. Pat. No. 8,307,177, entitled "SYSTEMS AND METHODS FOR MANAGEMENT OF VIRTUALIZATION DATA";
- U.S. Pat. No. 7,035,880, entitled "MODULAR BACKUP AND RETRIEVAL SYSTEM USED IN CONJUNCTION WITH A STORAGE AREA NETWORK";
- U.S. Pat. No. 7,343,453, entitled "HIERARCHICAL SYSTEMS AND METHODS FOR PROVIDING A UNIFIED VIEW OF STORAGE INFORMATION";
- U.S. Pat. No. 7,395,282, entitled "HIERARCHICAL BACKUP AND RETRIEVAL SYSTEM";
- U.S. Pat. No. 7,246,207, entitled "SYSTEM AND METHOD FOR DYNAMICALLY PERFORMING STORAGE OPERATIONS IN A COMPUTER NETWORK";
- U.S. Pat. No. 7,747,579, entitled "METABASE FOR FACILITATING DATA CLASSIFICATION";
- U.S. Pat. No. 8,229,954, entitled "MANAGING COPIES OF DATA";
- U.S. Pat. No. 7,617,262, entitled "SYSTEM AND METHODS FOR MONITORING APPLICATION DATA IN A DATA REPLICATION SYSTEM";
- U.S. Pat. No. 7,529,782, entitled "SYSTEM AND METHODS FOR PERFORMING A SNAPSHOT AND FOR RESTORING DATA";
- U.S. Pat. No. 8,230,195, entitled "SYSTEM AND METHOD FOR PERFORMING AUXILIARY STORAGE OPERATIONS";
- U.S. Pat. No. 7,315,923, entitled "SYSTEM AND METHOD FOR COMBINING DATA STREAMS IN A STORAGE OPERATION";
- U.S. Pat. No. 8,364,652, entitled "CONTENT-ALIGNED, BLOCK-BASED DEDUPLICATION";
- U.S. Pat. Pub. No. 2006/0224846, entitled "SYSTEM AND METHOD TO SUPPORT SINGLE INSTANCE STORAGE OPERATIONS";
- U.S. Pat. Pub. No. 2010-0299490, entitled "BLOCK-LEVEL SINGLE INSTANCING";
- U.S. Pat. Pub. No. 2009/0329534, entitled "APPLICATION-AWARE AND REMOTE SINGLE INSTANCE DATA MANAGEMENT";
- U.S. Pat. Pub. No. 2012/0150826, entitled "DISTRIBUTED DEDUPLICATED STORAGE SYSTEM";
- U.S. Pat. Pub. No. 2012/0150818, entitled "CLIENT-SIDE REPOSITORY IN A NETWORKED DEDUPLICATED STORAGE SYSTEM";
- U.S. Pat. No. 8,170,995, entitled "METHOD AND SYSTEM FOR OFFLINE INDEXING OF CONTENT AND CLASSIFYING STORED DATA"; and
- U.S. Pat. No. 8,156,086, entitled "SYSTEMS AND METHODS FOR STORED DATA VERIFICATION".

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers.

Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical virtual machine host operated by the organization. As one example, the organization may use one virtual machine as a database server and another virtual or physical machine as a mail server. A virtual machine manager (VMM) (e.g., a Hypervisor) may manage the virtual machines, and reside and execute on the virtual machine host. Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system residing on the client computing devices 102, and the primary storage devices 104. As an example, "information management system" may sometimes refer to one or more of the following components and corresponding data structures:

storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses & handles the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g. not mounted to tape or disk). Offline copies can include copies of data that the information management system 100 can access without human intervention (e.g. tapes within an automated tape library, but not yet mounted in a drive), and copies that the information management system 100 can access only with at least some human intervention (e.g. tapes located at an offsite storage site).

The Use of Intermediate Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability.

The intermediate components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any of the computing devices described above, without limitation In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

Figure 1B:
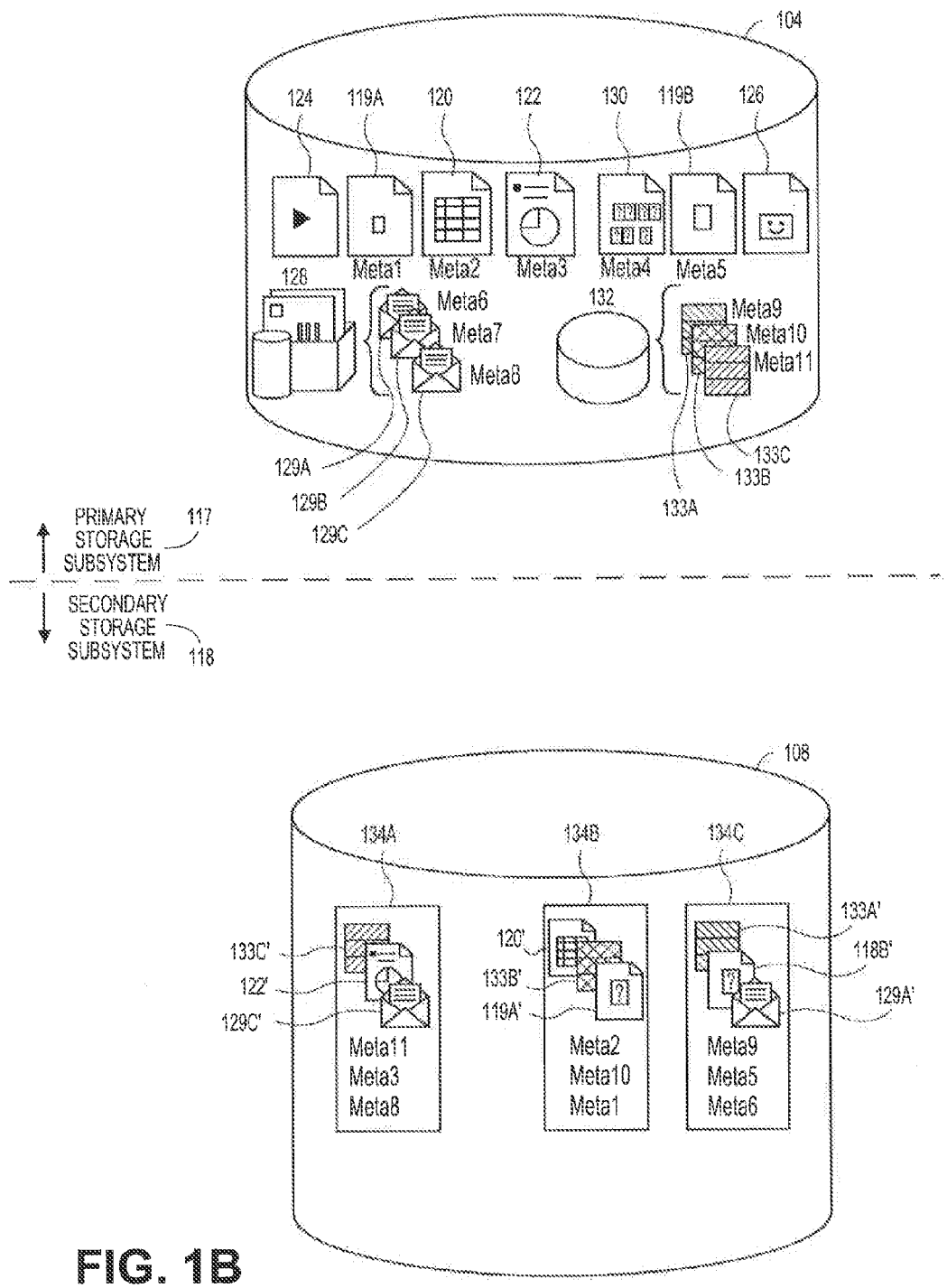
FIG. 1B is a detailed view of a primary storage device, a secondary storage device, and some examples of primary data and secondary copy data.

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C).

Some or all primary data objects are associated with corresponding metadata (e.g., "Meta1-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object. For example, secondary copy data object 134A represents three separate primary data objects 133C, 122 and 129C (represented as 133C', 122' and 129C', respectively). Moreover, as indicated by the prime mark ('), a secondary copy object may store a representation of a primary data object or metadata differently than the original format, e.g., in a compressed, encrypted, deduplicated, or other modified format.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
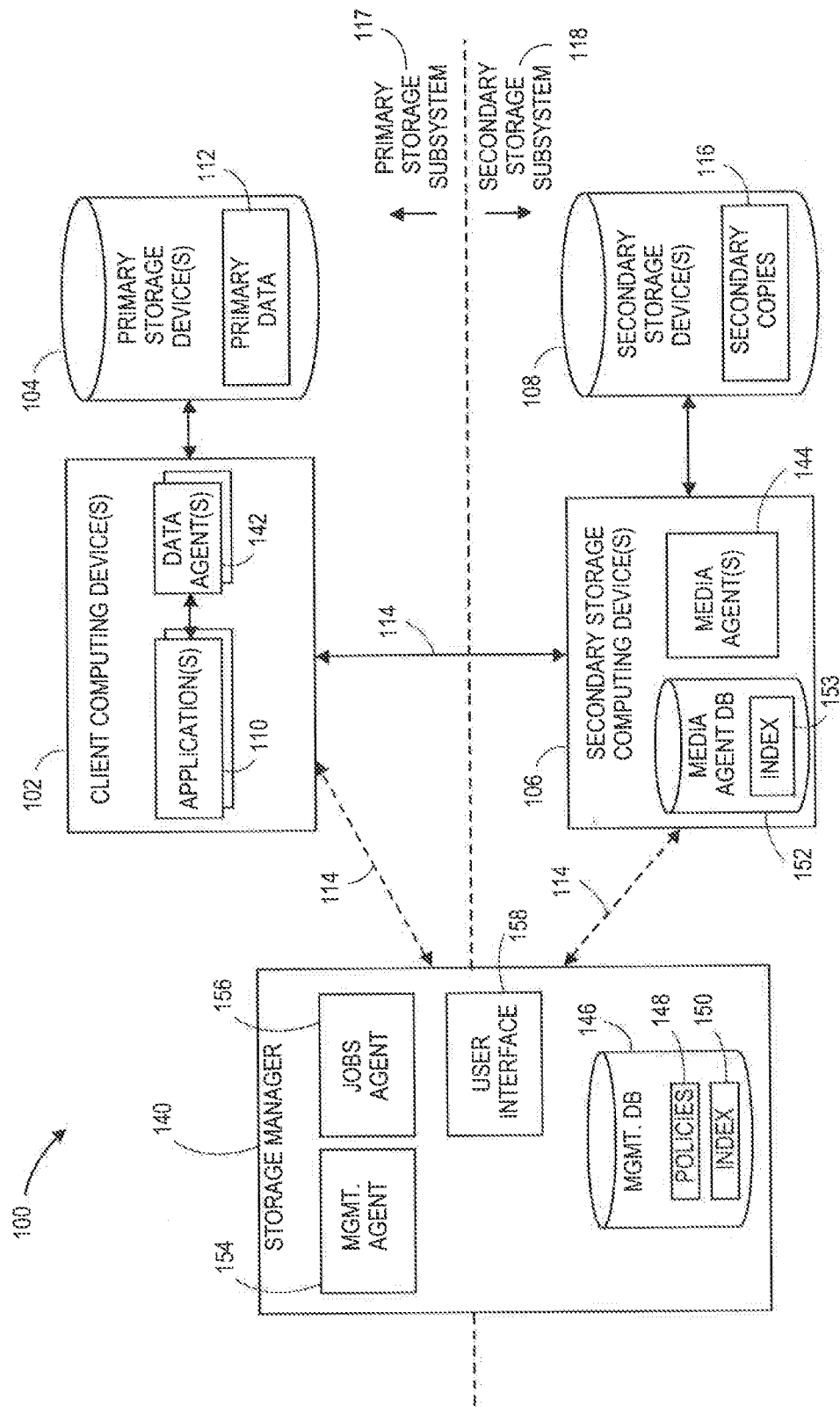
FIG. 1C is a block diagram of an exemplary information management system including a storage manager, one or more data agents, and one or more media agents.

FIG. 1C shows an information management system 100 designed according to these considerations and which includes: a central storage or information manager 140 configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 1C as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager is implemented on a separate computing device.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a computing device for hosting the storage manager 140 can be selected to best suit the functions of the storage manager 140. These and other advantages are described in further detail below with respect to FIG. 1D.

The storage manager 140 may be a software module or other application. The storage manager generally initiates, performs, coordinates and/or controls storage and other information management operations performed by the information management system 100, e.g., to protect and control the primary data 112 and secondary copies 116 of data and metadata.

As shown by the dashed, arrowed lines, the storage manager 140 may communicate with and/or control some or all elements of the information management system 100, such as the data agents 142 and media agents 144. Thus, in certain embodiments, control information originates from the storage manager 140, whereas payload data and payload metadata is generally communicated between the data agents 142 and the media agents 144 (or otherwise between the client computing device(s) 102 and the secondary storage computing device(s) 106), e.g., at the direction of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager provides one or more of the following functions:
  initiating execution of secondary copy operations;
  managing secondary storage devices 108 and inventory/capacity of the same;
  reporting, searching, and/or classification of data in the information management system 100;
  allocating secondary storage devices 108 for secondary storage operations;
  monitoring completion of and providing status reporting related to secondary storage operations;
  tracking age information relating to secondary copies 116, secondary storage devices 108, and comparing the age information against retention guidelines;
  tracking movement of data within the information management system 100;
  tracking logical associations between components in the information management system 100;
  protecting metadata associated with the information management system 100; and
  implementing operations management functionality.

The storage manager 140 may maintain a database 146 of management-related data and information management policies 148. The database 146 may include a management index 150 or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the storage manager index 150 may store data associating a client computing device 102 with a particular media agent 144 and/or secondary storage device 108, as specified in a storage policy.

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface through which users and system processes can retrieve information about the status of information management operations (e.g., storage operations) or issue instructions to the information management system 100 and its constituent components.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

The storage manager 140 may also track information that permits it to select, designate, or otherwise identify content indices, deduplication databases, or similar databases or resources or data sets within its information management "cell" (or another cell) to be searched in response to certain queries. Such queries may be entered by the user via interaction with the user interface 158. An information management cell may generally include a logical and/or physical grouping of a combination of hardware and software components associated with performing information management operations on electronic data. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of storage operation cells. Cells may also be delineated and/or organized hierarchically according to function, geography, architectural considerations, or other factors useful or desirable in performing information management operations. A first cell may represent a geographic segment of an enterprise, such as a Chicago office, and a second storage operation cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

In general, the management agent 154 allows multiple information management cells 100 to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. No. 7,035,880, which is incorporated by reference herein.

Data Agents

As discussed, a variety of different types of applications 110 can reside on a given client computing device 102, including operating systems, database applications, e-mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access data stored on the secondary storage devices 108, whether it be for the purposes of reading, writing, modifying, or deleting data. Moreover, as will be described further, media agents 144 can generate and store data and metadata data that generally provides insight into the data stored on associated secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 104.

While media agent(s) 144 are generally associated with one or more secondary storage devices 108, one or more media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

Where the information management system 100 includes multiple media agents 144 (FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number (LUN) and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the database 152 may operate as a cache, it can also be referred to as an index cache. In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the storage management database 146 is relatively large, the management database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
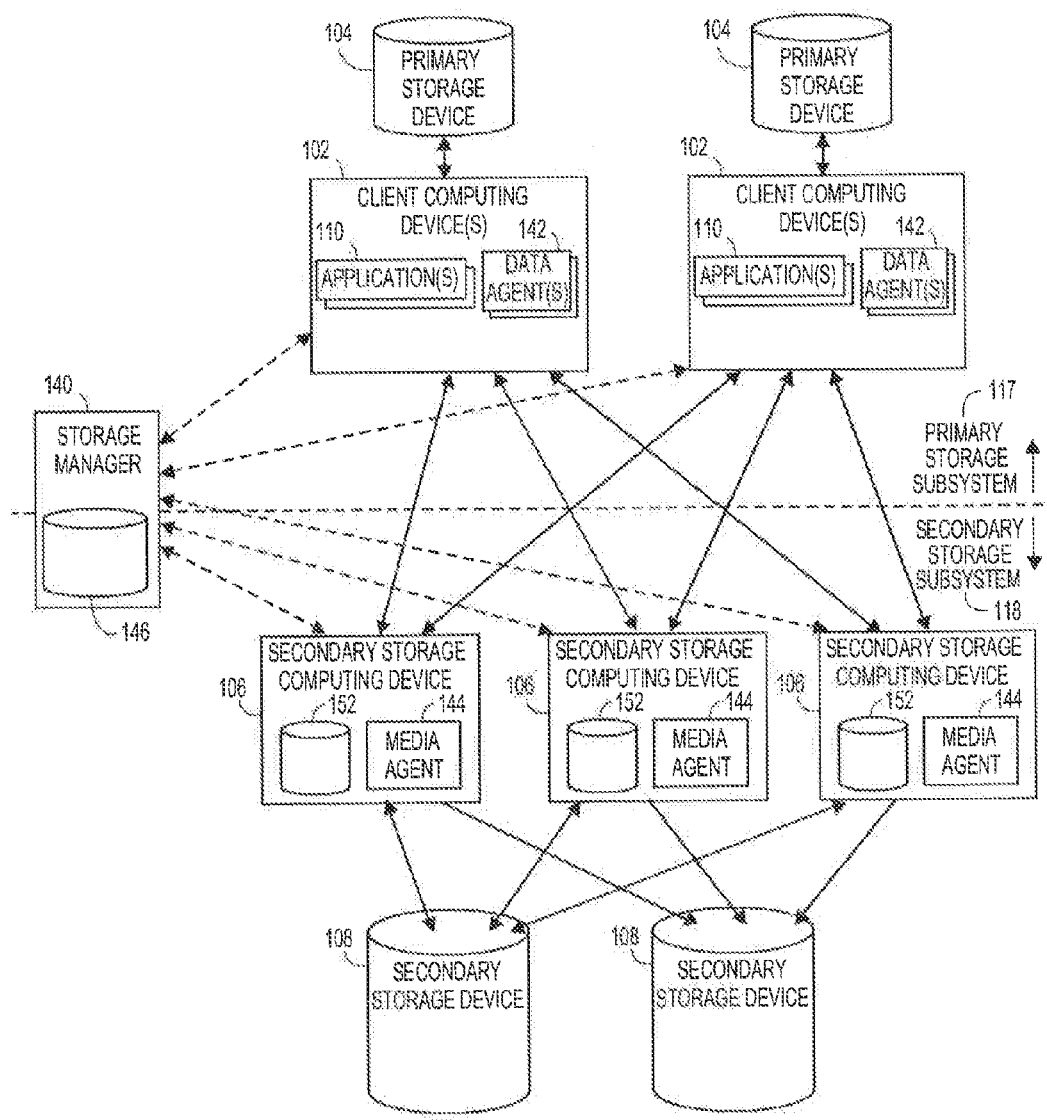
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the volume-level, file-level, or block-level. Volume level backup operations generally involve the copying of a data volume (e.g., a logical disk or partition) as a whole. In a file-level backup, the information management system 100 may generally track changes to individual files at the file-level, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, entitled "SYSTEM AND METHOD FOR ARCHIVING OBJECTS IN AN INFORMATION STORE", which is incorporated by reference herein.

Snapshot Operations

Snapshot operations can provide a relatively lightweight, efficient mechanism for protecting data. From an end-user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware" snapshot operation can be a snapshot operation where a target storage device (e.g., a primary storage device 104 or a secondary storage device 108) performs the snapshot operation in a self-contained fashion, substantially independently, using hardware, firmware and/or software residing on the storage device itself. For instance, the storage device may be capable of performing snapshot operations upon request, generally without intervention or oversight from any of the other components in the information management system 100. In this manner, using hardware snapshots can off-load processing involved in creating and management from other components in the system 100.

A "software" snapshot operation, on the other hand, can be a snapshot operation in which one or more other components in the system (e.g., the client computing devices 102, media agents 104, etc.) implement a software layer that manages the snapshot operation via interaction with the target storage device. For instance, the component implementing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. In some other cases, the snapshot may created at the block-level, such as where creation of the snapshot occurs without awareness of the file system. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of data within the system. For instance, some or all of the above-described secondary storage operations can involve deduplication in some fashion. New data is read, broken down into portions (e.g., sub-file level blocks, files, etc.) of a selected granularity, compared with blocks that are already stored, and only the new blocks are stored. Blocks that already exist are represented as pointers to the already stored data.

In order to streamline the comparison process, the information management system 100 may calculate and/or store signatures (e.g., hashes) corresponding to the individual data blocks in a database and compare the hashes instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. Pub. No. 2012/0084269, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., data-block signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 (or other source storage device, such as a secondary storage device 108) to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial or "primary" secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the data stored within the primary data 112 and/or secondary copies 116, providing enhanced search capabilities for data discovery and other purposes. The content indexing can be used to identify files or other data objects having pre-defined content (e.g., user-defined keywords or phrases), metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

In order to leverage the data stored in the information management system 100 to perform these and other tasks, one or more components can be configured to scan data and/or associated metadata for classification purposes to populate a database of information (which can be referred to as a "metabase"). Such scanned, classified data and/or metadata may be included in a separate database and/or on a separate storage device from primary data 112 (and/or secondary copies 116), such that operations related to the database do not significantly impact performance on other components in the information management system 100.

In other cases, the database(s) may be stored along with primary data 112 and/or secondary copies 116. Files or other data objects can be associated with user-specified identifiers (e.g., tag entries) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229, 954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343, 453, entitled "HIERARCHICAL SYSTEMS AND METHODS FOR PROVIDING A UNIFIED VIEW OF STORAGE INFORMATION", which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

As an example, a storage manager 140 or other component in the information management system 100 may analyze traffic patterns and suggest or automatically route data via a particular route to e.g., certain facilitate storage and minimize congestion. In some embodiments, the system can generate predictions relating to storage operations or storage operation information. Such predictions described may be based on a trending analysis that may be used to predict various network operations or use of network resources such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of a set of associated storage operation cells in a hierarchy of information management cells, such as the status of jobs, system components, system resources, and other items, by communicating with storage managers 140 (or other components) in the respective storage operation cells. Moreover, the master storage manager 140 may track the status of its associated storage operation cells and associated information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager or other component in the system may also determine whether a storage-related criteria or other criteria is satisfied, and perform an action or trigger event (e.g., data migration) in response to the criteria being satisfied, such as where a storage threshold is met for a particular volume, or where inadequate protection exists for certain data. For instance, in some embodiments, the system uses data from one or more storage operation cells to advise users of risks or indicates actions that can be used to mitigate or otherwise minimize these risks, and in some embodiments, dynamically takes action to mitigate or minimize these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be able to be restored within a given time period, that data on a secondary volume may be mirrored or otherwise migrated to a specified number of other volumes, etc.). If a risk condition or other criteria is triggered, the system can notify the user of these conditions and may suggest (or automatically implement) an action to mitigate or otherwise address the condition or minimize risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies a particular storage criteria and, if so, perform an action. For example, as previously described, a storage policy or other definition might indicate that a storage manager 140 should initiate a particular action if a storage metric or other indication drops below or otherwise fails to satisfy a specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priorities or "weights" to certain data or applications, corresponding to its importance (priority value). The level of compliance with the storage operations specified for these applications may also be assigned a certain value. Thus, the health, impact and overall importance of a service on an enterprise may be determined, for example, by measuring the compliance value and calculating the product of the priority value and the compliance value to determine the "service level" and comparing it to certain operational thresholds to determine if the operation is being performed within a specified data protection service level. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about network elements to generate indications of costs associated with storage of particular data in the system or the availability of particular data in the system. In general, components in the system are identified and associated information is obtained (dynamically or manually). Characteristics or metrics associated with the network elements may be identified and associated with that component element for further use generating an indication of storage cost or data availability. Exemplary information generated could include how fast a particular department is using up available storage space, how long data would take to recover over a particular network pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides. Storage devices may be assigned to a particular cost category which is indicative of the cost of storing information on that device. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console. The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history and storage policy. Such reports may be specified and created at a certain point in time as a network analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like)

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately.

The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how clients 102 (or groups thereof) may utilize system resources, such as available storage on cloud storage and/or network bandwidth. A provisioning policy specifies, for example, data quotas for particular client computing devices 102 (e.g. a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

schedules or other timing information, e.g., specifying when and/or how often to perform information management operations;

the type of copy 116 (e.g., type of secondary copy) and/or copy (e.g., type of secondary copy) format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation between different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Storage Operations

Figure 1E:
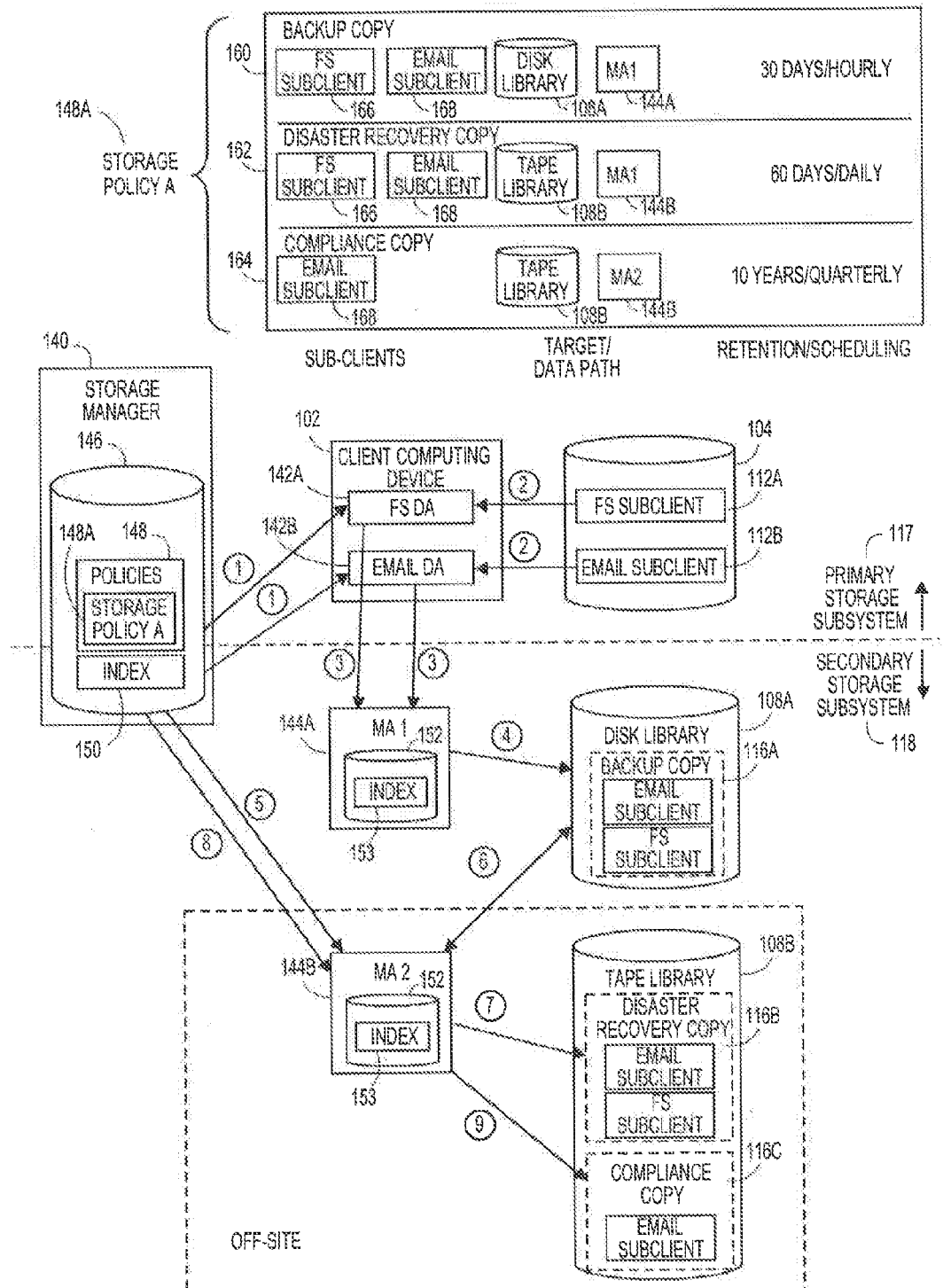
FIG. 1E illustrates certain secondary copy operations according to an exemplary storage policy.

FIG. 1E shows a data flow data diagram depicting performance of storage operations by an embodiment of an information management system 100, according to an exemplary data storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a logical grouping of data associated with a file system) and a logical grouping of data associated with email data, respectively. Although for simplicity the logical grouping of data associated with the file system is referred to as a file system sub-client, and the logical grouping of data associated with the email data is referred to as an email sub-client, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes backup copy preferences or rule set 160, disaster recovery copy preferences rule set 162, and compliance copy preferences or rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 166, and not the file system sub-client 168. Compliance copies generated according to the compliance copy rule set 164 will therefore not include primary data 112A from the file system sub-client 166. For instance, the organization may be under an obligation to store maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 140 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116C may be generated in some other manner, such as by using the primary data 112A, 112B from the storage device 104 as source data. The disaster recovery copy operation is initiated once a day and the disaster recovery copies 116A are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, in the illustrated example, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 116A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the media agent index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the storage manager index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 150, 153 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and U.S. Pat. Pub. No. 2010-0299490, each of which is incorporated by reference herein.

FIGS. 1F and 1G are diagrams of example data streams 170 and 171, respectively, that may be employed for performing data storage operations. Referring to FIG. 1F, the data agent 142 forms the data stream 170 from the data associated with a client 102 (e.g., primary data 112). The data stream 170 is composed of multiple pairs of stream header 172 and stream payload 174. The data streams 170 and 171 shown in the illustrated example are for a single-instanced storage operation, and a stream payload 174 therefore includes both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 Kb. The first two stream header 172 and stream payload 174 pairs comprise a first data block of size 64 Kb. The first stream header 172 indicates that the length of the succeeding stream payload 174 is 63 Kb and that it is the start of a data block. The next stream header 172 indicates that the succeeding stream payload 174 has a length of 1 Kb and that it is not the start of a new data block. Immediately following stream payload 174 are an identifier header 176 and identifier data 178 pair. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
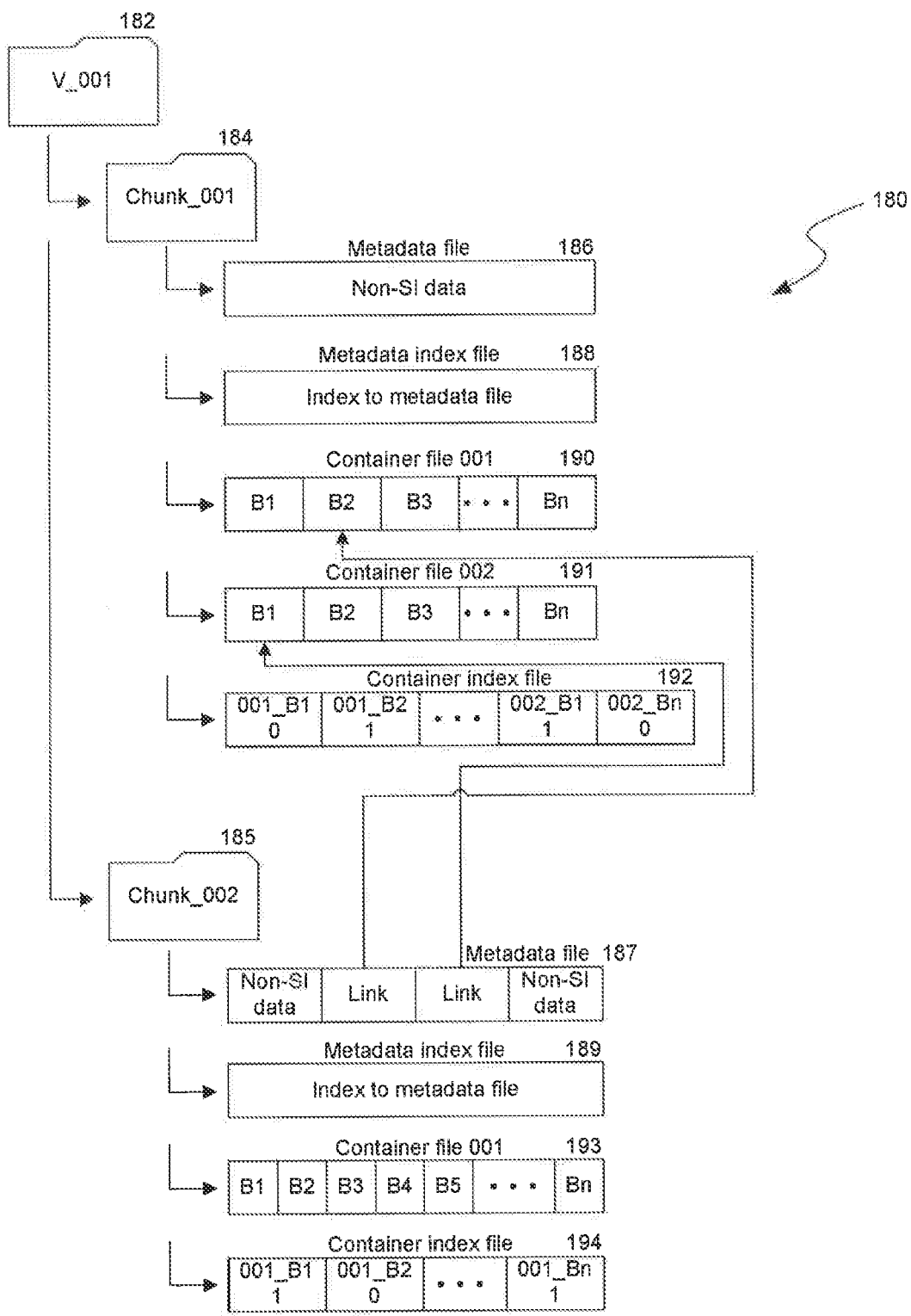

FIG. 1H is a diagram illustrating the data structures 180 that may be used to store blocks of SI data and non-SI data on the storage device (e.g., secondary storage device 108). According to certain embodiments, the data structures 180 do not form part of a native file system of the storage device. The data structures 180 include one or more volume folders 182, one or more chunk folders 184/185 within a volume folder 182, and multiple files within a chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

Figure 7:
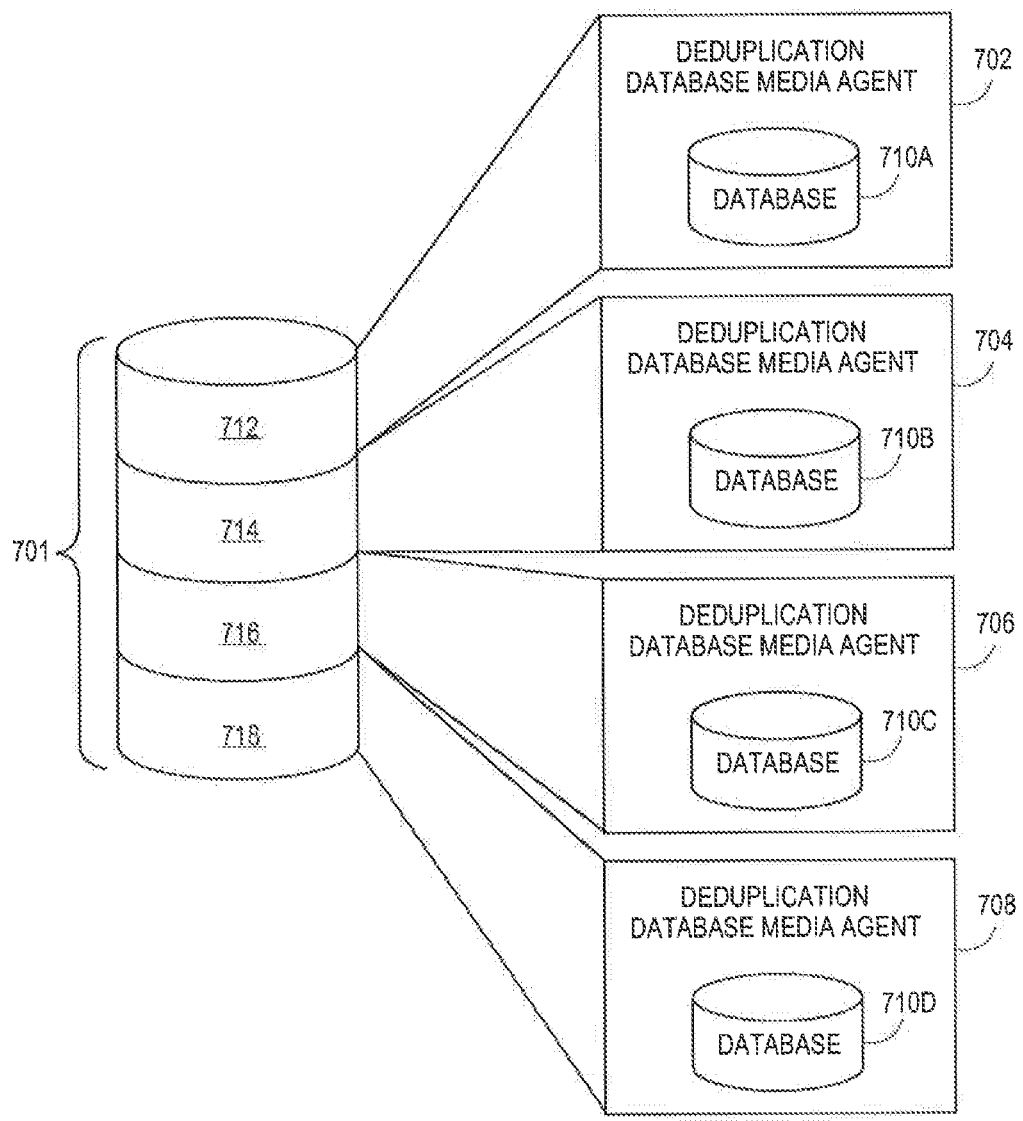
FIG. 7 is a block diagram illustrative of an embodiment of multiple deduplication database media agents arranged as logical partitions of a global deduplication database, according to certain embodiments.

As an example, the data structures 180 illustrated in FIG. 7 may have been created as a result of two storage operations involving two clients 102. For example, a first storage operation on a first client 102 could result in the creation of the first chunk folder 184, and a second storage operation on a second client 102 could result in the creation of the second chunk folder 185. The container files 190/191 in the first chunk folder 184 would contain the blocks of SI data of the first client 102. If the two clients 102 have substantially similar data, the second storage operation on the data of the second client 102 would result in the media agent 144 storing primarily links to the data blocks of the first client 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 resides supports sparse files, then when the media agent 144 creates container files 190/191/193, it can create them as sparse files. As previously described, a sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 Mb. In other examples, the media agent 144 creates a new container file 190/191/193 when a container file 190/191/193 satisfies other criteria (e.g., it contains from approximately 100 to approximately 1000 blocks or when its size exceeds approximately 50 Mb to 1 Gb).

In some cases, a file on which a storage operation is performed may comprise a large number of data blocks. For example, a 100 Mb file may be comprised in 400 data blocks of size 256 Kb. If such a file is to be stored, its data blocks may span more than one container file, or even more than one chunk folder. As another example, a database file of 20 Gb may comprise over 40,000 data blocks of size 512 Kb. If such a database file is to be stored, its data blocks will likely span multiple container files, multiple chunk folders, and potentially multiple volume folders. As described in detail herein, restoring such files may thus requiring accessing multiple container files, chunk folders, and/or volume folders to obtain the requisite data blocks.

Example High Availability Deduplication System

Figure 2A:
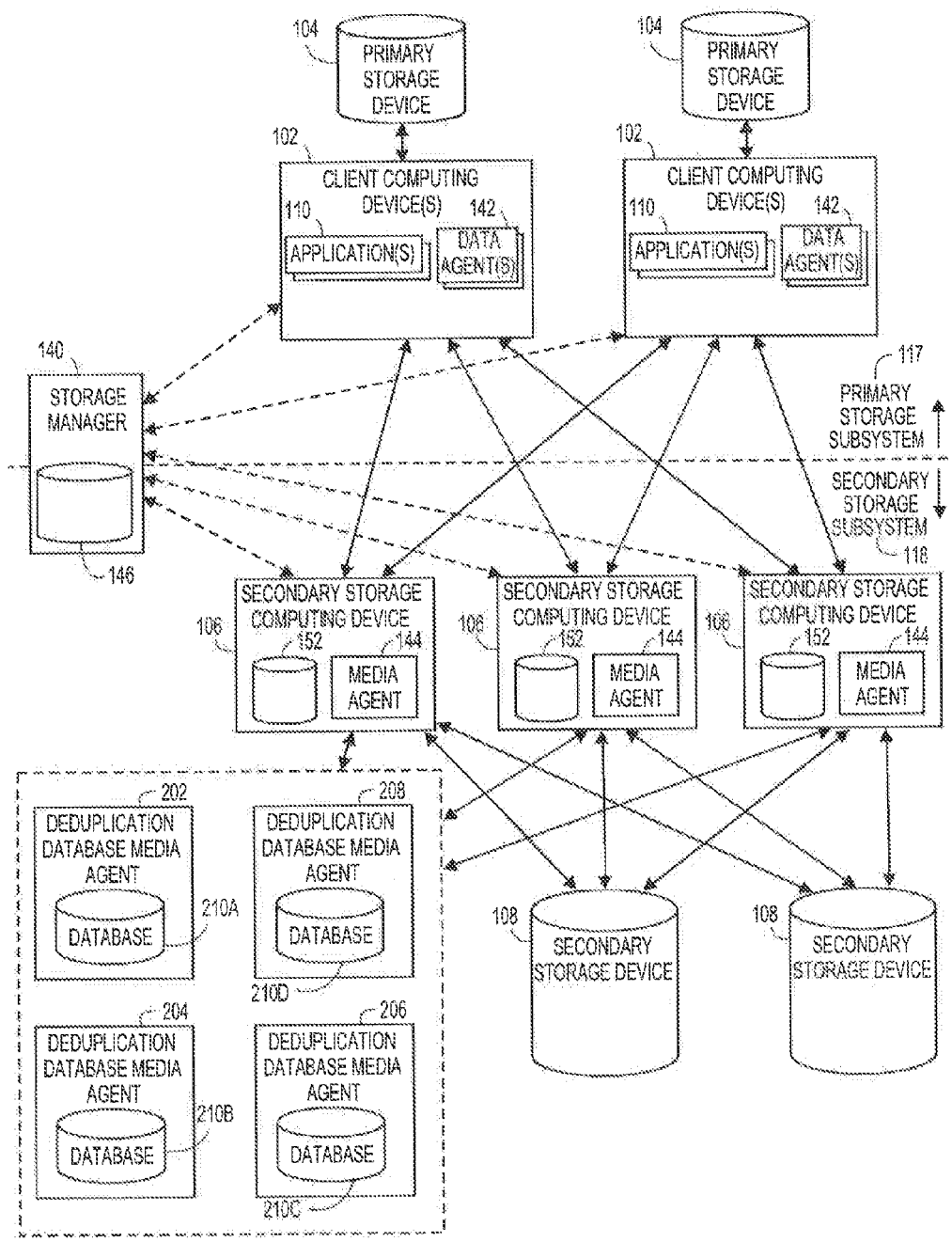
FIG. 2A is a block diagram illustrating a scalable information management system.

As shown in FIG. 2A, the system 100 can further include one or more deduplication database media agents 202-208 (DDB media agents), examples of which are described in greater detail in U.S. Pub. No. 2012/0150826, previously incorporated herein by reference. The DDB media agents 202-208 can include deduplication databases 210A-210D that store deduplication information, such as data block signatures and the location information of data blocks stored in the secondary storage devices 108, as described above. The deduplication databases 210A-210D can also store other deduplication information, such as a count value indicative of the number of instances that a particular block is used. Furthermore, the DDB media agents 202-208 can be implemented on the same computing devices 106 as one or more of the media agents 144, or on separate computing devices 106.

During a backup or other secondary copy operation using deduplication techniques, the system 100 can query the DDB media agents 202-208 for signatures of the data blocks to be backed up. In some embodiments, the client computing device 102 can query the DDB media agents 202-208 and in certain embodiments, the secondary storage computing devices 106 can query the DDB media agents 202-208. When a signature is found in the DDB media agents 202-208, a link to the location of a copy of the data block stored in the secondary storage devices 108 is stored as part of the backup. When a signature is not found in the DDB media agents 202-208, a copy of the data block is stored in the secondary storage devices 108, and the signature of the data block is stored in the DDB media agents.

A data block distribution policy can specify which DDB media agents 202-208 store which signatures and which DDB media agents 202-208 are therefore queried for particular data block signatures. For example, the distribution policy can indicate that data block signatures are stored in DDB media agents 202-208 based on a modulo operation of the signature of the data block, as described previously. Furthermore, should one of the DDB media agents (e.g., DDB media agent 202) become unavailable, the distribution policy can specify another DDB media agent (e.g., DDB media agent 206) as a failover DDB media agent and use the failover DDB media agent for deduplication operations while the other DDB media agent (DDB media agent 202) is unavailable.

Figure 2B:
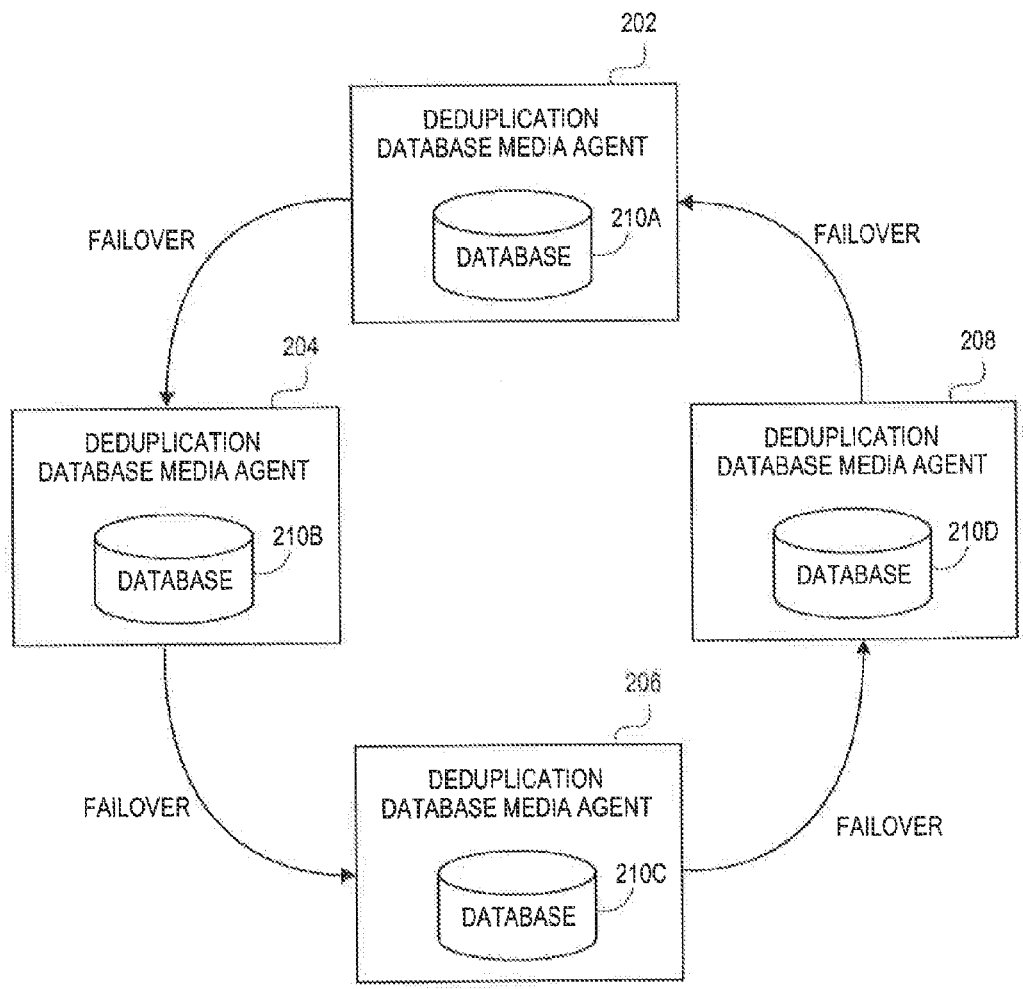
FIG. 2B is a logical block diagram illustrative of an embodiment of a technique for implementing a failover scheme for a group of deduplication database media agents

FIG. 2B is a block diagram illustrative of an embodiment of failover policy or scheme for deduplication database media agents 202-208. As described previously, in some embodiments, DDB media agents 202-208 can become unavailable due to a network outage, power outage, hardware/software malfunction, scheduled maintenance, etc. When a DDB media agent becomes unavailable, a failover DDB media agent can be used in its place.

In the illustrated embodiment of FIG. 2B, four DDB media agents (DDB media agent 202, DDB media agent 204, DDB media agent 206, DDB media agent 208) are implemented as failover DDB media agents in a round robin fashion, such that each DDB media agent is configured as a failover DDB media agent for another DDB media agent, e.g., DDB media agent 202 is the failover DDB media agent for DDB media agent 208, DDB media agent 204 is the failover DDB media agent for DDB media agent 202, DDB media agent 206 is the failover DDB media agent for DDB media agent 204, and DDB media agent 208 is the failover DDB media agent for DDB media agent 206. In this way, should any one of the DDB media agents become unavailable, its assigned failover DDB media agent will handle any additional queries. Furthermore, should all but one DDB media agent become unavailable, the remaining DDB media agent can satisfy the signature queries for the other DDB media agents.

It will be understood that other techniques can be used to implement the failover policy. For example, one of the DDB media agents can be identified as the failover DDB media agent for multiple DDB media agents. Alternatively, one DDB media agent can remain in a stand-by mode and can be activated when another one of the DDB media agents becomes unavailable.

In some embodiments, when one of the DDB media agents becomes unavailable, the signature function can be altered such that signatures that are assigned to be stored by the unavailable DDB media agent are evenly distributed amongst the other DDB media agents. As a non-limiting example, modulo four can be used to evenly distribute signatures between four DDB media agents. If the third DDB media agent becomes unavailable, the system can identify the signatures that are assigned to be stored in the third DDB media agent. Once the signatures assigned to the third DDB media agent are identified, the system can use modulo three to evenly distribute those signatures to the three available DDB media agents. Thus, the system can maintain data integrity by continuing to use modulo four to evenly distribute the signatures amongst the four DDB media agents as if all four DDB media agents are available, and using modulo three to evenly distribute the signatures assigned to the third DDB media agent to the remaining available DDB media agents.

Figure 3:
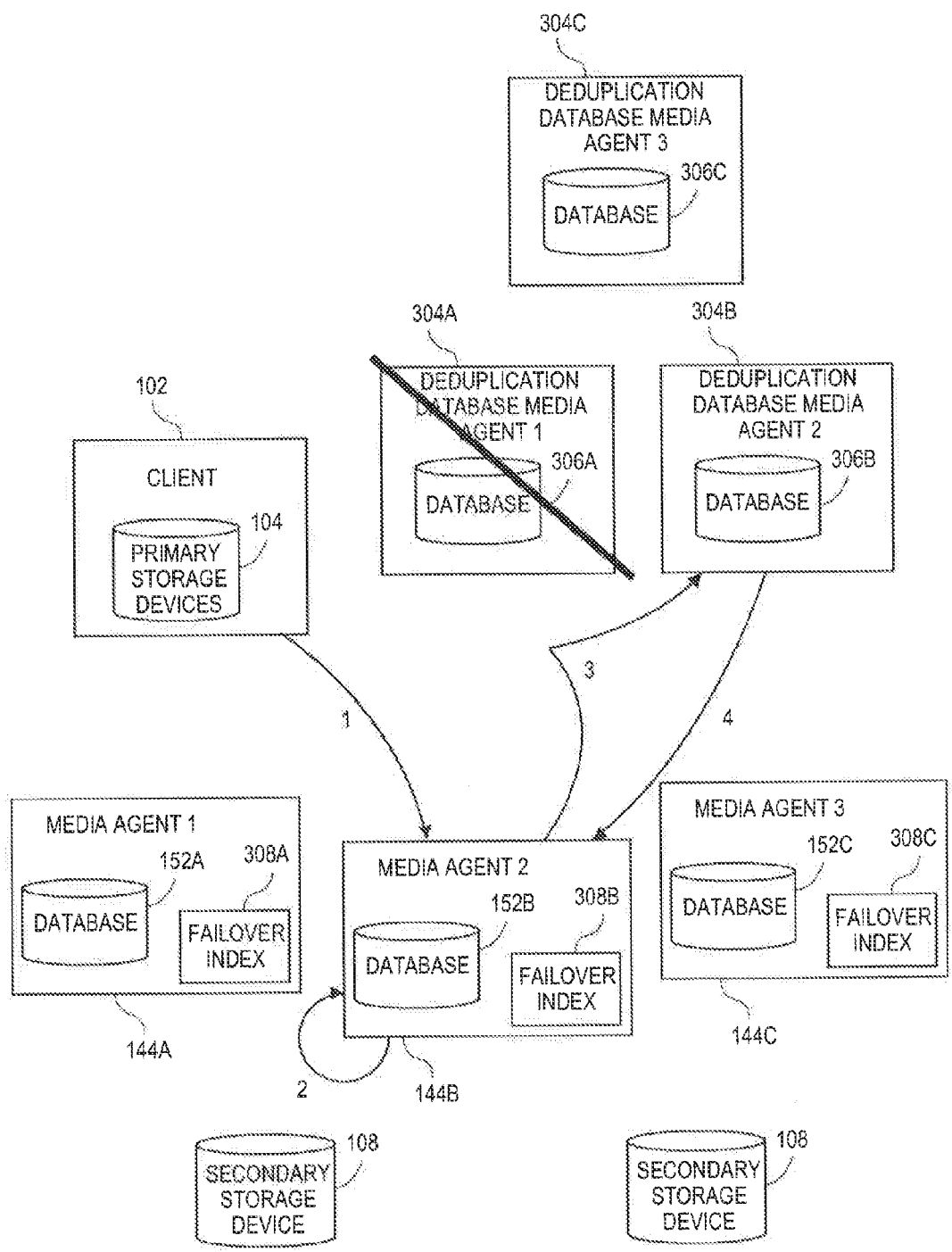
FIG. 3 is a data flow diagram illustrative of the interaction between the various components of the information management system when a deduplication database media agent becomes unavailable, according to certain embodiments.

FIG. 3 is a data flow diagram illustrative of the interaction between the various components of the system 100 when a DDB media agent is unavailable. While described with respect to backup for the purposes of illustration, the techniques described herein are compatible with other types of storage operations, such as, for example, replication, snapshots, archiving, pruning, and the like.

The illustrated embodiment includes a client computing device 102 with an associated primary storage device 104, deduplication database media agents 304A, 304B, 304C

(referred to generically as "DDB media agent 304"), deduplication databases 306A, 306B, 306C, each associated with one of the DDB media agents (referred to generically as "DDB 306"), media agents 144A, 144B (referred to generically as "media agent 144"), and secondary storage devices 108, each of which is described in greater detail above. The other components of the system 100 are not shown for purposes of simplicity.

Furthermore, while a single client 102 is shown for the purpose of illustration, there may be more than one client in other embodiments. Similarly, there can be any number of DDB media agents (e.g., one or more) and media agents (e.g., one or more). Additionally, in certain embodiments, some of the components shown as separate components in FIG. 3 can reside on a single computing device. In some embodiments, for example, the functionality of the DDB media agent 306A and the media agent 144A can be implemented on a first computing device, the functionality of the DDB media agent 306B and the media agent 144B can be implemented on another computing device, etc.

In the illustrated embodiment, the data blocks (or other units) in secondary storage are stored separately from the deduplication management information. For example, in some embodiments, the media agents 144 aid in the storage of the data blocks in the secondary storage devices 108. In contrast, the DDB media agents 304 store the deduplication management information such as data block signatures (e.g., hashes) and storage location information for the data blocks in the secondary storage devices 108. The location information for the data blocks stored in the secondary storage devices 108 can also be referred to as a link.

Generally, deduplication management information can include any appropriate information used to manage the deduplication process. As an example, in addition to deduplication signatures, the management information can further include metadata related to the deduplicated data blocks. For instance, a count value may be maintained for each deduplicated data block that indicates the number of times the particular data block is being used. As one example, if two files each include three instances of a particular data block, and a third file includes one instance of the data block, the count for that data block would be seven. The management information can further include addresses or other location information related to the data blocks. As yet another example, the management information can include mappings of the individual deduplicated files including pointers to the data blocks making up the files and an indication as to the ordering of the data blocks within the files.

As described above, the signature can be generated using a hash function or some other function, and can be used by the system 100 to determine whether the data block already exists in the storage system. The signature can also be used to determine the location of data blocks within the secondary storage devices 108 and the like. As described, location information is associated with each signature and is used by the system 100 to locate and retrieve specific data blocks.

In one embodiment, the link includes a media agent ID indicating which media agent 144 was used to store the data block, and a path ID, address and offset indicating where the data block stored in the secondary storage devices 108, The location information or link can generally include various types of media agent identifiers, directory names, filenames, address locations, pointers, offsets, and the like, which can aid the system in locating individual data blocks. The media agent identifiers can include MAC addresses, IP addresses, router information, directory information, filenames and/or other alphanumeric identifiers capable of uniquely identifying the different media agents 144. Thus, the DDB media agents 304 store signatures and links to data blocks stored within the secondary storage devices 108. The links can include, without limitation, a signature associated with the block and identifiers indicative of the location of the data block. The locational identifiers can include positional information such as the relevant host, mount point, file identifier, offset and size of the block, etc.

As will be described in greater detail below, the media agents 144 use the links during storage operations to reference data blocks already stored in secondary storage (i.e. redundant data blocks). The media agents 144 can also use the links during restore operations to locate and retrieve data blocks stored in the secondary storage devices 108.

In the illustrated embodiment, the media agents 144 store files received from the client as a plurality of individual data blocks in secondary storage. In some embodiments, the data blocks associated with a specific file can be distributed across multiple media agents 144.

As mentioned previously, the system 100 can use various distribution policies to determine which media agents 144 store which data blocks. In some embodiments, the system selects a media agent 144 to backup a particular file (or block(s) in a file) based on a predetermined distribution policy. For instance, the system 100 can perform a modulo or other appropriate operation on the signature of the file (or block(s) in the file) and select the appropriate media agent based on the output of the operation.

Similarly, the storage system can use similar data block distribution policies to identify a media agent 144 storing a particular file for purposes of a restore operation. In one embodiment, the storage manager or another component can track which media agent 144 handled the backup operation, and send the restore request to that media agent 144.

With further reference to FIG. 3, the interaction between the various components of the storage environment when one of the DDB media agents becomes unavailable will now be described in greater detail with respect to data flow steps indicated by the numbered arrows. In the illustrated embodiment, there are three DDB media agents 304A, 304B, 304C and modulo 3 is used to distribute the signatures between the three DDB media agents. It will be understood that functions other than a modulo may be used. For example, the storage system can distribute queries to the respective DDB media agents based on factors other than the modulo of the signature, e.g., based on file type, client source, modulo of the data block, pseudo-randomly, etc.

Furthermore, in the illustrated embodiment, each DDB media agent 304 acts as a failover DDB media agent for another DDB media agent. For example, in the illustrated embodiment, DDB media agent1 304A is the failover DDB media agent for DDB media agent3 304C, DDB media agent2 304B is the failover DDB media agent for DDB media agent1 304A, and DDB media agent3 304C is the failover DDB media agent for DDB media agent2 304B. In addition, in the illustrated embodiment, the system 100 has determined that DDB media agent1 304A is unavailable.

At step 1, the client 102 initiates a storage operation of a file stored in the primary storage device 104. In the illustrated embodiment, the media agent2 144B is selected to handle the storage operation based on the distribution policy. As mentioned previously, any one of the media agents 144 can be selected to handle the storage operation according to the particular predetermined policy.

As part of the storage operation, the file is broken up into data blocks, and the media agent2 144B performs a signature function on each data block. In the illustrated embodiment, each data block is sent to the media agent2 144B for storage, based on the predefined distribution policy. In some embodiments, a data agent residing on the client performs the signature function on the data block and the signature is initially sent to the media agent2 144B. If it is determined that the data block is not stored in secondary storage, the data block is sent as well.

Before storing a copy of each data block in secondary storage, the media agent2 144B determines whether the identified data block is already stored in the secondary storage devices 108 by consulting one of the DDB media agents 304. As mentioned previously, the DDB media agents 304 store signatures of the data blocks stored in the secondary storage devices 108, and the signatures are distributed amongst the DDB media agents based on a distribution policy. Having knowledge of this policy, the media agents 144 can advantageously identify the appropriate DDB media agent 304 to query regarding the presence of the data block in secondary storage. In the present example, the distribution policy dictates that a modulo of the signature of the data block is used to select the appropriate DDB media agent 304.

Accordingly, at step 2, the media agent2 144B performs the modulo operation on the signature of the data block and identifies the DDB media agent assigned to store the signature. Based on the output of the modulo operation, the media agent2 144B, determines that the DDB media agent1 304A is assigned to store the signature corresponding to the data block.

As mentioned, in the illustrated embodiment, the system 100 has detected that the DDB media agent1 304A is unavailable. Thus, as part of step 2, the media agent2 144B can identify the failover DDB media agent (DDB media agent2 304B) for DDB media agent1 304A and determine that the failover DDB media agent is to be queried for the signature. The media agent2 can identify the failover DDB media agent by referring to the distribution policy and/or a failover policy, as described in greater detail above. The media agent2 144B can determine that the failover DDB media agent is to be queried for the signature dynamically or based on information that is stored at the time the system detects that the DDB media agent1 304A is unavailable.

At step 3 the media agent2 144B queries the failover DDB media agent (DDB media agent2 304B) for the signature. At step 4, the DDB media agent2 304B responds. If the DDB media agent2 304B locates an entry in its DDB 306B corresponding to the signature, the DDB media agent2 304B accesses the entry. According to certain embodiments, the entry can include a copy of the signature, a link identifying the location of the corresponding data block in the secondary storage devices 108, and a count value. The count value can correspond to a number of instances of the particular data block in the files or other data stored in the secondary storage devices 108. For instance, while there may only be one stored copy of the data block in the secondary storage devices 108, because of the deduplication, multiple files stored in the secondary storage devices 108 may point to the copy of the data block. The DDB media agent 2 304B forwards the link to media agent 2 144B. Upon receiving the link, the media agent2 144B can store the link or other metadata representative of the data block in the secondary storage devices 108 instead of storing another copy of the data block.

In the event that the DDB media agent2 304B does not find the signature, the DDB media agent2 304B responds to the media agent2 144B indicating that the data block is not stored in secondary storage. In turn, the media agent 2 144B stores the data block in the secondary storage devices 108. The media agent2 144B can also send the signature of the data block as well as location information indicating where the data block is stored in the secondary storage devices 108 to the DDB media agent2 304B. Upon receiving the signature and the location information, the DDB media agent2 304B uses the location information to generate a link for the data block and stores the link and/or signature in DDB 306A for future reference.

Alternatively, once the DDB media agent2 304B determines that the data block is not stored in secondary storage, it stores the signature in the DDB 306A before responding to the media agent2 144B. In response, the media agent2 144B stores the data block, as discussed above, and sends the location information of the data block to the DDB media agent2 304B. In turn, the DDB media agent2 304B generates the link and stores the link in the DDB 306A along with the already-stored signature. In addition to the examples provided, it will be appreciated that a variety of other handshaking mechanisms are possible between the media agents 144 and the DDB media agents 304.

The remaining data blocks of the file are backed up to the media agent2 144B in a similar fashion, wherein copies of the data blocks themselves are stored for new data blocks and links to redundant data blocks are stored in the secondary storage devices 108, as appropriate.

A similar process can be used to prune data from secondary storage. For example, when data is removed from the secondary storage devices 108 to long-term storage (e.g. magnetic tape), steps 1-3 can be used to query the appropriate DDB media agent to reduce the count value of a particular data block signature. For instance, when a particular data block is removed, the selected media agent (e.g., media agent 144B) uses the distribution scheme to query the appropriate DDB media agent 304 (e.g., failover DDB media agent 2 304B). If a stored count value associated with the data block indicates that no more instances of the data block exist in the secondary storage devices 108 (e.g., the count value of the signature is zero), the queried DDB media agent 304 can delete the signature from its DDB 306, and the media agent can remove the data block from the secondary storage devices 108. If, after deletion, the count value is greater than or equal to one, then one or more instances of the data block will remain in the secondary storage devices 108 following deletion, and the count value will decremented without deleting the instance of the signature from the database 306.

Figure 4:
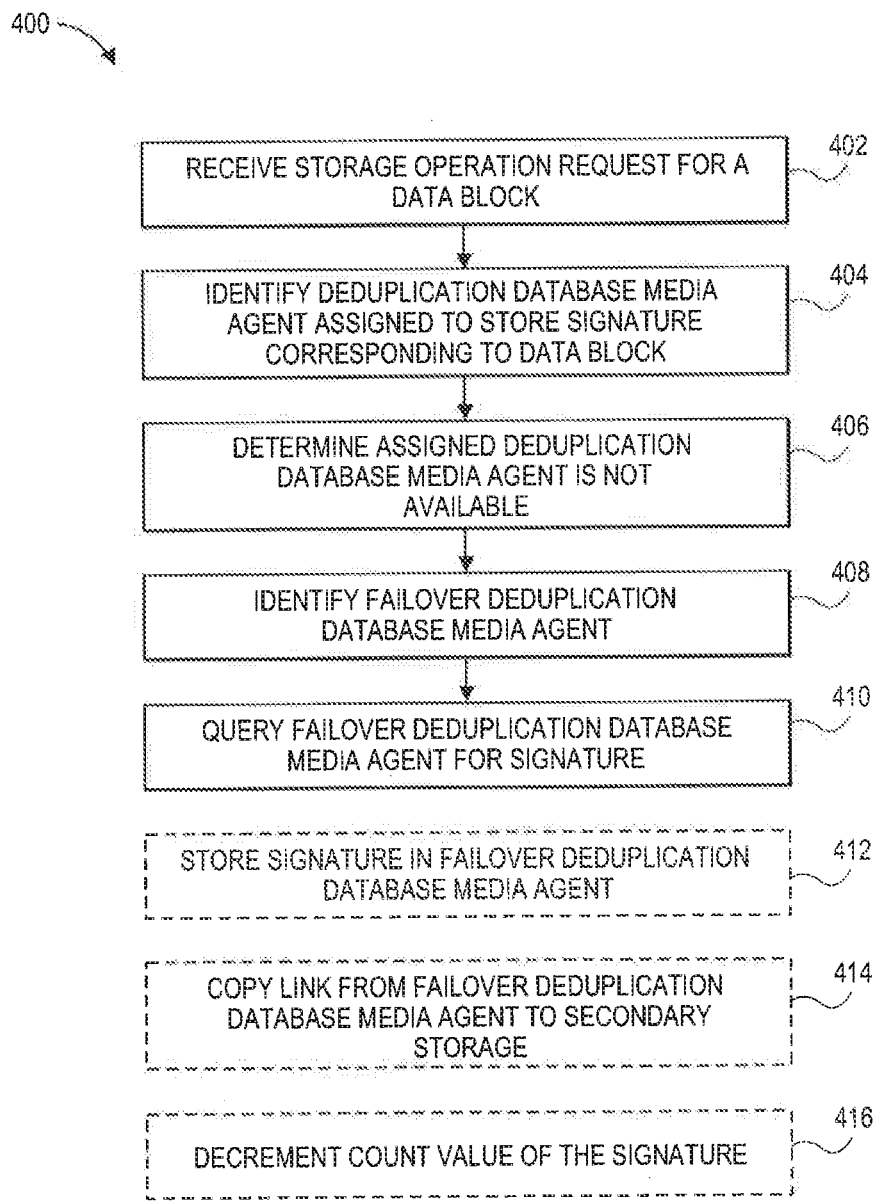
FIG. 4 is a flow diagram of a routine implemented by the storage system for processing a storage operation and storing data blocks to secondary storage when a deduplication database media agent is unavailable, according to certain embodiments.

FIG. 4 is a flow diagram of a routine implemented by the storage system for processing a storage operation and storing data blocks to secondary storage. One skilled in the relevant art will appreciate that the elements outlined for routine 400 may be implemented by one or many computing devices/components that are associated with the storage system 100. For example, the routine 400 can be implemented by any one, or a combination, of the client computing device 102, the data agent 142, the storage manager 140, the secondary storage computing device 106, deduplication database media agent (DDB media agent) 304 (i.e. any one of the DDB media agent 304A-304B), the media agent 144 (i.e. any one of the media agents 144A-144C) and the like. Accordingly, routine 400 has been described as being generally performed by the system 100.

At block 402, the system 100 receives a storage operation request for a data block. The request can be received from the client, a new client, one client on behalf of another, a storage manager, the media agent, the DDB media agent, or the like. Alternatively, the system 100 can receive a signature of a data block or a file, as described above.

At block 404, the system 100 identifies the DDB media agent assigned to store the signature corresponding to the data block. As mentioned previously, the signature can be calculated by a variety of components of the system and can be used to uniquely identify the data block. Further, the system 100 can identify the assigned DDB media agent using any number of techniques. In some embodiments, the system 100 performs a modulo operation on the signature of the data block to identify the DDB media agent assigned to store the signature associated with the data block.

At block 406, the system 100 determines that the assigned DDB media agent is unavailable. The DDB media agent may become unavailable due to due to a network outage, power outage, hardware/software malfunction, scheduled maintenance, etc. The system can determine the DDB media agent is not available by requesting status updates from the different DDB media agents, reviewing status updates automatically sent by the DDB media agents, etc.

At block 408, the system 100 identifies a failover DDB media agent. For example, the system 100 may identify the failover DDB media agent by consulting the distribution policy, which stores an indication of the failover DDB media agent. The distribution policy can specify the failover DDB media agents for each DDB media agent in the system 100. In other embodiments, the failover DDB media agent is stored in a data structure that is separate from the distribution policy. In some embodiments, the system 100 identifies the failover DDB media agent at the time the system 100 detects that a DDB media agent is unavailable, and stores an indication of the unavailable DDB media agent and the appropriate failover DDB media agent in conjunction with the distribution policy, or in a separate location, depending on the embodiment. In certain embodiments, the system 100 identifies the failover DDB media agent dynamically, each time a data block is stored, e.g., when the unavailable DDB media agent is identified as the DDB media agent assigned to store the signature corresponding to the data block.

The system 100 can use a variety of techniques to determine which DDB media agent is the failover DDB media agent for each DDB media agent. In some embodiments, each DDB media agent is a failover for another DDB media agent. In certain embodiments, the DDB media agents are not failover DDB media agents for each other (i.e. if DDB media agent1 is the failover DDB media agent for DDB media agent2 then DDB media agent2 is not the failover DDB media agent for DDB media agent1). In some embodiments, the DDB media agents are failover DDB media agents for at most one other DDB media agent. In certain embodiments, one DDB media agent is the failover DDB media agent for multiple DDB media agents. The distribution policy can use any one or a combination of the aforementioned embodiments, or other techniques, to assign one or more failover DDB media agents for each DDB media agent.

At block 410, the system 100 queries the failover DDB media agent for the data block location. Following the query, the system 100 determines whether the data block is located in secondary storage using information found in the DDB media agent.

One skilled in the art will appreciate that routine 400 can include fewer, more, or different blocks than those illustrated in FIG. 4 without departing from the spirit and scope of the description. In some embodiments, any one, or a combination of the blocks 412, 414, 416 can be used as part of the routine 400. For example, if the storage operation is a backup operation and the signature is not stored in the failover DDB media agent, the system 100 can store the signature in the failover DDB media agent, as illustrated at block 412. In addition, a copy of the data block can be stored in the secondary storage devices 108 and the location of the copy can be sent to the failover DDB media agent for storage.

In some embodiments, if the signature is stored in the failover DDB media agent, the system 100 can store a link to the copy of the data block stored in the secondary storage devices 108 and increment a count value in the DDB media agent to indicate that a new instance of the data block has been backed up, as illustrated at block 414.

In certain embodiments, if the storage operation is a pruning operation, the system can decrement the count value in the DDB media agent, as illustrated at block 416. Further, if the count value reaches zero, the system can remove the signature from the DDB media agent and delete the copy of the data block from the secondary storage devices 108.

In addition, prior to querying the DDB media agent, the system can query the database 152 of a media agent for the data block or the location of the data block. If the data block (or its locations) is not found in the database 152 of the media agent, the system can query the DDB media agent or failover DDB media agent. If the data block is found in the database 152 of the media agent, and the storage operation is a backup operation, the system can store a link to the data block in the media agent and notify the DDB media agent, or failover DDB media agent, that a new instance of the data block is now found in the secondary storage devices 108. In addition, the backup storage device can aggregate a number of queries to the DDB media agent, and transmit all the queries together as a bundle.

In some embodiments, when an unavailable DDB media agent becomes available, the failover DDB media agent can copy the signatures that would have been stored on the unavailable DDB media agent if it had been available to the previously unavailable DDB media agent. For example, entries in the DDB of the failover DDB media agent and corresponding failover data blocks can be identified (e.g., using a modulo operation) and copied to the DDB of the previously unavailable DDB media agent which has come back on-line. As part of the copy operation, the previously unavailable DDB media agent and the failover DDB media agent can synchronize the data to remove duplicate signatures and data blocks. As part of the synchronization process, the system can remove duplicate data blocks in the secondary storage and update the links in the secondary storage devices that reference the duplicate data blocks. Following the synchronization process, the system can avoid referring to the failover DDB media agent during future copy operations while the previously unavailable DDB media agent is available.

In addition to the embodiments described above with reference to FIGS. 1A-1E and 2A, the system can include a failover index 308. In the illustrated embodiment of FIG. 3, a failover index is included in each of the media agents 144A-144C (failover indexes 308A-308C, respectively) and can be implemented as part of the database 152 and/or index 153, described previously, or can be a separate index. However, it will be understood that the failover index can be located in the client 102, data agent 142, storage manager 140, in the DDB media agents 304, etc.

The failover index 308 can store the failover policy for the system. Thus, the failover index 308 can be used by the system to determine the failover DDB media agent(s) for each DDB media agent. Furthermore, in some embodiments, the failover index 308 can store additional information that can be used when a DDB media agent becomes unavailable, and after the DDB media agent comes back on-line. For example, as will be described in greater detail below, the failover index 308 can track which DDB media agents are unavailable, the amount of time a DDB media agent is unavailable, signatures that were stored in a failover DDB media agent as a result of the unavailability of another DDB media agent, location information for data blocks in secondary storage that were stored when the assigned DDB media agent was unavailable, etc.

In some embodiments, the failover index can track which DDB media agents have been unavailable and their corresponding failover DDB media agents. Once an unavailable DDB media agent becomes available and the system queries it for a signature, if the signature is not found, the system can query the failover DDB media agent for the signature. For example, assuming DDB media agent1 304A has been unavailable, the system can record that DDB media agent1 304A was unavailable and also record the identity of the failover DDB media agent (DDB media agent2 304B) that stored any signatures on behalf of the DDB media agent1 304A. After the DDB media agent1 304A comes back on-line and following a failed query to the DDB media agent1 304A (e.g. the signature was not found), the system can use the tracked information to query the failover DDB media agent for the signature.

Furthermore, in certain embodiments, the failover index 308 can store signature information when a DDB media agent becomes unavailable and a failover DDB media agent is used. For example, if DDB media agent1 304A becomes unavailable and signatures assigned to be stored in DDB media agent1 304A are stored in DDB media agent2 304B (the failover DDB media agent), the failover index 308B can track the signatures that are stored in the failover DDB media agent (DDB media agent2 304B), for later reference by the system. The failover index 308 can include the signatures stored in failover DDB media agents when a DDB media agent is unavailable, as well as location information of the signatures, including where the signature is located in the failover DDB media agent.

In some embodiments, the failover index 308 can be used as the failover DDB media agent. For example, when a DDB media agent becomes unavailable, the signatures that would have been stored in the unavailable DDB media agent can be stored in the failover index 308. Thus, when a media agent 144 receives a signature for the unavailable DDB media agent, it can refer to the failover index 308. If the signature is not found in the failover index 308, a copy of the data block can be stored in the secondary storage devices, and the location of the copied data block and a copy of the signature can be stored in the failover index 308. If the signature is found in the failover index 308, the media agent 144 can use the location information of the copied data block that is stored in the failover index 308 as part of the backup operation. When the unavailable DDB media agent becomes available, the failover index can copy and synchronize its contents with the previously unavailable DDB media agent.

Figure 5:
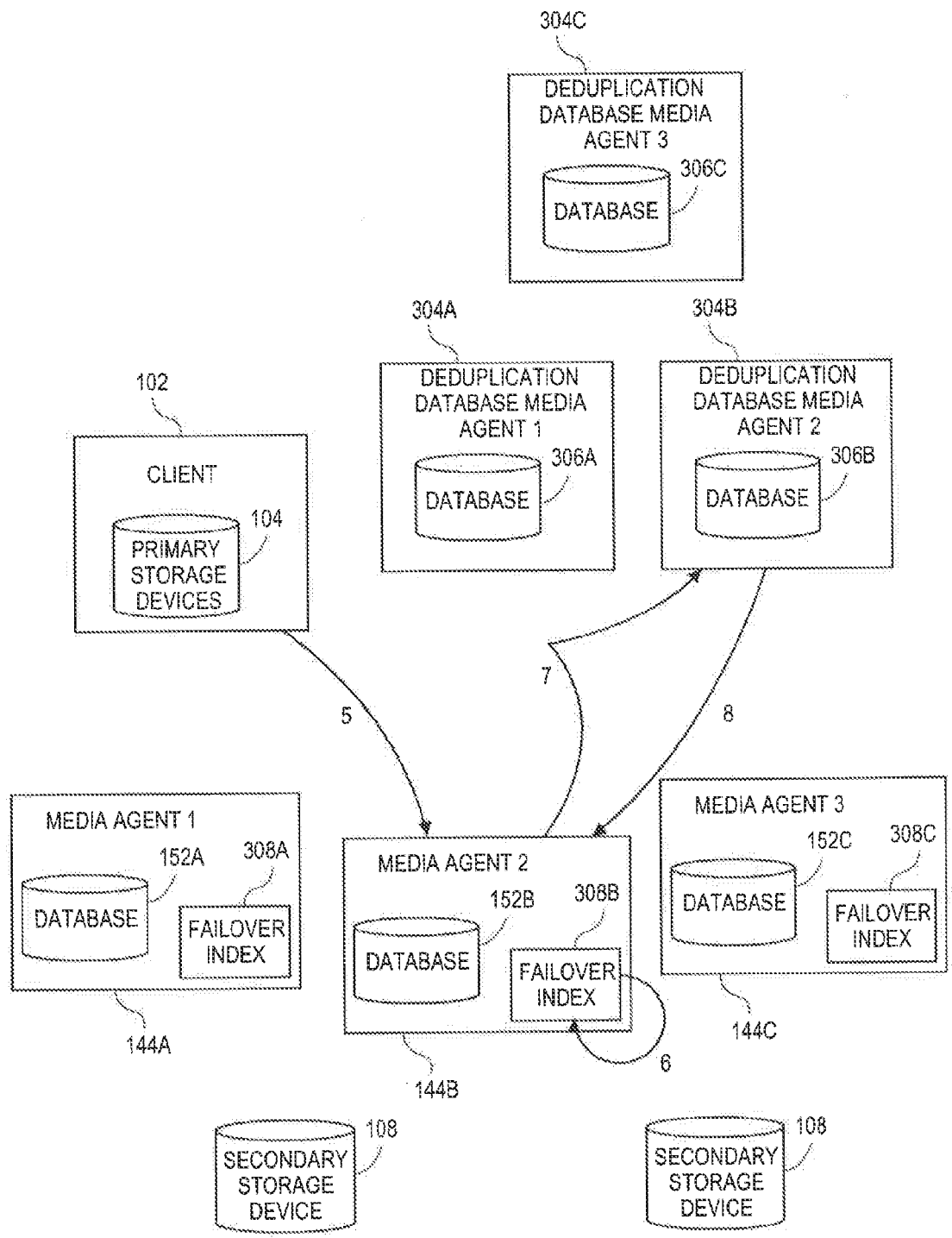
FIG. 5 is a data flow diagram illustrative of the interaction between the various components of the system after an unavailable deduplication database media agent becomes available, according to certain embodiments.

FIG. 5 is a data flow diagram illustrative of the interaction between the various components of the system 100 after a previously unavailable DDB media agent becomes available. While described with respect to backup for the purposes of illustration, the techniques described herein are compatible with other types of storage operations, such as, for example, replication, snapshots, archiving, pruning, and the like.

At step 5, the client 102 initiates a storage operation of a file stored in the primary storage device 104. As mentioned previously, a signature for each data block in the file is determined. In addition, prior to storing a copy of each data block, the media agent2 144B determines whether the received data block is already stored in the secondary storage devices 108 by consulting one of the DDB media agents 304.

At step 6, the media agent2 144B performs a DDB media agent identifier operation on the signature of the data block to identify the DDB media agent 304 assigned to store the signature. Based on the output of the operation, the media agent2 144B, determines that the DDB media agent1 304A is assigned to store the signature corresponding to the data block.

However, as discussed in greater detail above with reference to FIG. 3, as DDB media agent1 304A was previously unavailable, some signatures that would have been stored in DDB media agent1 304A were stored in the failover DDB media agent (DDB media agent2 304C). Accordingly, as part of step 6, the media agent2 144B determines whether the signature was stored in the failover DDB media agent. The system can determine that the signature was stored in the failover DDB media agent using a variety of techniques. For example, the system can use the DDB media agent failover index 308B to track the signatures stored in a failover DDB media agent while the DDB media agent1 304A was unavailable. As discussed previously, the failover index 308B can include the signature of the data block as well as an identifier indicating in which failover DDB media agent the signature is located. If the signature is found in the failover index 308B, the system can determine that the signature was stored in the failover DDB media agent.

At step 7 in the illustrated embodiment, the media agent2 144B determines that the signature was stored in the DDB media agent2 304B (the failover DDB media agent for DDB media agent1 304A) and queries the failover DDB media agent for the signature and the location of the data block. The failover DDB media agent can increment the count value of the signature.

Similarly, if the storage operation is a pruning operation and the system determines that the signature is stored in the failover DDB media agent, the system can decrement the count value in the failover DDB media agent. If the count value in the failover DDB media agent indicates there are no more instances of the data block in the secondary storage devices 108, the system can delete the copy of the data block that is referenced by the signature in the failover DDB media agent. However, it will be understood that there may still be a copy of the data block in the secondary storage devices 108 that is identified by the assigned DDB media agent.

In some embodiments, if the system determines that the signature was not stored in the failover DDB media agent, the system can use the assigned DDB media agent to store the signature, retrieve the location of the data block, and/or increment/decrement the count value of the signature, according to the distribution policy. Thus, the system can use the failover DDB media agent for the signatures stored thereon while the other DDB media agent was unavailable and use the assigned DDB media agent for all other signatures.

At step 8, the failover DDB media agent provides the signature information to the media agent2 144B. As mentioned previously, the signature information can include location information regarding the location of the data block in the secondary storage devices 108.

Figure 6:
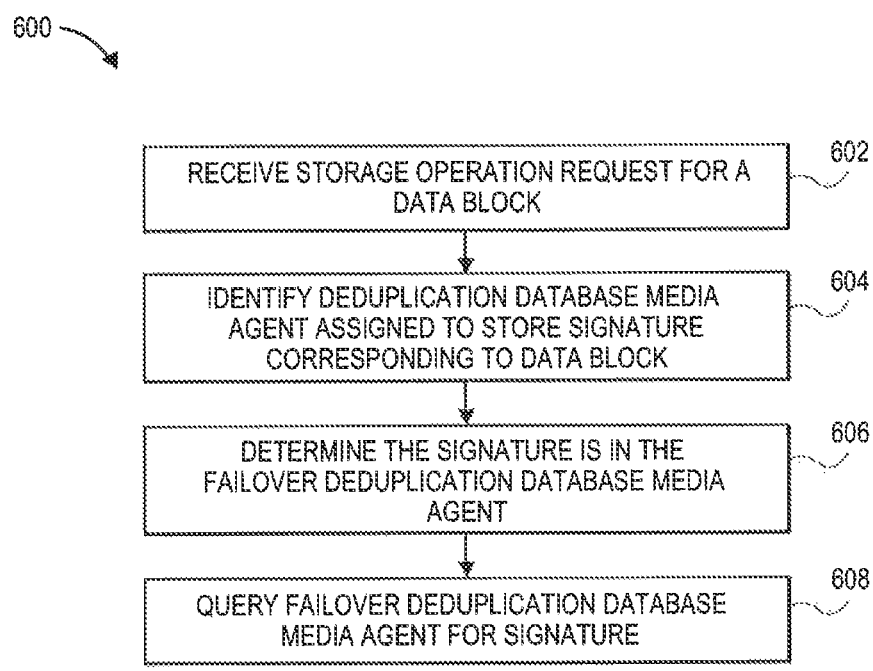
FIG. 6 is a flow diagram of a routine implemented by the storage system for processing a storage operation and storing data blocks to secondary storage, according to certain embodiments.

FIG. 6 is a flow diagram of a routine implemented by the storage system for processing a storage operation and storing data blocks to secondary storage. One skilled in the relevant art will appreciate that the elements outlined for routine 600 may be implemented by one or many computing devices/components that are associated with the storage system 100. For example, the routine 600 can be implemented by any one, or a combination, of the client computing device 102, the data agent 142, the storage manager 140, the secondary storage computing device 106, deduplication database media agent (DDB media agent) 304 (i.e. any one of the DDB media agent 304A-304B), the media agent 144 (i.e. any one of the media agents 144A-144C) and the like. Accordingly, routine 600 has been logically associated as being generally performed by the system 100, and thus the following illustrative embodiments should not be construed as limiting.

At block 602, the system 100 receives a storage operation request for a data block. The request can be received from the client, a new client, one client on behalf of another, a storage manager, the media agent, the DDB media agent, or the like. Alternatively, the system 100 can receive a signature of a data block or a file, as described above.

At block 604, the system 100 identifies the DDB media agent assigned to store the signature corresponding to the data block. As mentioned previously, the signature can be calculated by a variety of components of the system and can be used to uniquely identify the data block. Further, the system 100 can identify the assigned DDB media agent using any number of techniques. In some embodiments, the system 100 performs a modulo operation on the signature of the data block to identify the DDB media agent assigned to store the signature associated with the data block.

At block 606, the system 100 determines that although the signature is assigned to be stored in the assigned DDB media agent, the signature is stored in a failover DDB media agent. As discussed in greater detail above, this can be due to the unavailability of the assigned DDB media agent for a period of time and the system 100 assigning the failover DDB media agent to handle signature queries for the assigned DDB media agent.

At block 608, the system 100 queries the failover DDB media agent for the data block location. Based on the query the failover DDB media agent can increment or decrement the count value of the associated signature, as discussed in greater detail above with reference to FIG. 4. If the count value is decremented to zero, the system 100 can remove the corresponding data block from the secondary storage devices 108 and can remove the signature from the failover DDB media agent.

One skilled in the art will appreciate that routine 600 can include fewer, more, or different blocks than those illustrated in FIG. 6 without departing from the spirit and scope of the description. For example, in some embodiments, the system can query the failover DDB media agent only if the signature is not found in the assigned DDB media agent.

FIG. 7 is a block diagram illustrative of an embodiment of multiple DDB media agents (DDB media agent 702, DDB media agent 704, DDB media agent 706, DDB media agent 708) arranged as logical partitions of a global deduplication database 701. As illustrated in FIG. 7, each of the DDB media agents 702-708 can be associated with a partition (partitions 712-718, respectively) of the database 701. Specifically, the database 710 of each DDB media agent 702-708 (databases 710A-710D, respectively) can correspond to the partitions 712-718 of the global deduplication database 701. The global deduplication database 701 can be a distributed database arranged on separate computing devices or be part of a single computing device. For example, each DDB media agent 702-708 can correspond to a separate computing device with separate storage or one or more DDB media agents 702-708 can reside on a single computing device. In this way, the DDB media agents 702-708 can be treated as a single database for access purposes. When a DDB media agent becomes unavailable, the partition of the database 701 previously assigned to the unavailable DDB media agent is assigned to the DDB media agent designated (e.g., by a round-robin or other failover policy) as the failover DDB media agent. For instance, if DDB media agent 702 becomes unavailable and DDB media agent 704 is the failover DDB media agent 702 according to the failover policy, the partition 712 of the database 701 may be assigned to DDB media agent 704 as a result of the unavailability of DDB media agent 702. At that point, DDB media agent 704 is associated with both the partition 712 that was previously assigned to the now unavailable DDB media agent 702 as well as the partition 714 originally assigned to DDB media agent 704. If DDB media agent 702 becomes available again, the storage manager or other appropriate entity may re-associate partition 712 back to DDB media agent 702.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed is:

1. A method of performing a storage operation in a distributed, deduplicated storage system, comprising:
   receiving at a first secondary storage computing device of a plurality of secondary storage computing devices a request from a client computing device to backup a file comprising a plurality of data blocks and stored in primary storage,
   wherein a first deduplication database computing device of a plurality of deduplication database computing devices communicatively coupled to the first secondary storage computing device is configured to store a first subset of signature blocks based at least in part on a data block distribution policy and is designated as a failover deduplication database computing device for a second deduplication database computing device of the plurality of deduplication database computing devices that is configured to store, based at least in part on the data block distribution policy, a second subset of the signature blocks that is different from and does not overlap with the first subset of the signature blocks,
   wherein the plurality of deduplication database computing devices store the signature blocks corresponding to data blocks stored in secondary storage, wherein the data blocks stored in the secondary storage correspond to data blocks stored in primary storage, at least one signature block of the signature blocks comprising a signature of at least one data block of the plurality of data blocks, location information of the at least one data block in the secondary storage, and a reference count value indicative of a quantity of one or more references in the secondary storage to the at least one data block;
   in response to the request and using one or more processors, calculating a signature of a particular data block of the plurality of data blocks using a signature function;
   identifying the second deduplication database computing device as the deduplication database computing device assigned to store the signature of the particular data block;
   determining that the second deduplication database computing device is unavailable; and
   querying the first deduplication database computing device for the signature of the particular data block,
   the method further comprising at least one of:
      based at least in part on an indication from the first deduplication database computing device that the signature of the particular data block does not reside in the first deduplication database computing device, store the signature in a failover index, cause at least one storage device of the of the secondary storage to store a copy of the particular data block, and request the first deduplication database computing device to store the signature of the particular data block and a location of the copy of the particular data block, or
      based at least in part on an indication from the first deduplication database computing device that the signature of the particular data block resides in the first deduplication database computing device, cause at least one storage device of the of the secondary storage to store a reference to a copy of the particular data block that is stored in the secondary storage.

2. The method of claim 1, wherein each deduplication database computing device is assigned to store a different group of unique signatures.

3. The method of claim 1, wherein the first deduplication database computing device is assigned to store a first set of signatures and the second deduplication database computing device is assigned to store a second set of signatures different from the first set of signatures.

4. The method of claim 1, wherein each deduplication database computing device of the plurality of deduplication database computing devices is identified as a failover deduplication database computing device to another one of the plurality of deduplication database computing devices.

5. The method of claim 1, further comprising identifying a third deduplication database computing device as the failover deduplication database computing device for the first deduplication database computing device and identifying the second deduplication database computing device as the failover deduplication database computing device for the third deduplication database computing device.

6. The method of claim 1, further comprising calculating a signature of each of the plurality of data blocks using the signature function.

7. A distributed deduplicated storage system, comprising:
a plurality of deduplication database computing devices configured to store signature blocks corresponding to a plurality of data blocks stored in one or more storage devices of secondary storage, at least one signature block of the signature blocks comprising a signature of at least one data block of the plurality of data blocks, location information of the at least one data block in the one or more storage devices, and a reference count value indicative of a quantity of one or more references in the secondary storage to the at least one data block,
wherein a first deduplication database computing device of the plurality of deduplication database computing devices is configured to store a first subset of the signature blocks based at least in part on a data block distribution policy and is designated as a failover deduplication database computing device for a second deduplication database computing device of the plurality of deduplication database computing devices that is configured to store, based at least in part on the data block distribution policy, a second subset of the signature blocks that is different from and does not overlap with the first subset of the signature blocks; and
a plurality of secondary storage computing devices communicatively coupled to the plurality of deduplication database computing devices, each of the plurality of secondary storage computing devices comprising one or more processors and storage, wherein at least one secondary storage computing device of the plurality of secondary storage computing devices further comprises a failover index and is configured to:
receive a request to backup a file comprising a plurality of data blocks and stored in primary storage,
calculate a signature of a particular data block of the plurality of data blocks using a signature function,
identify the second deduplication database computing device as the deduplication database computing device assigned to store the signature of the particular data block,
determine that the second deduplication database computing device is unavailable, and
query the first deduplication database computing device for the signature of the particular data block,
wherein the at least one secondary storage computing device is further configured to at least one of:
based at least in part on an indication from the first deduplication database computing device that the signature of the particular data block does not reside in the first deduplication database computing device, store the signature in the failover index, cause at least one storage device of the one or more storage devices of the secondary storage to store a copy of the particular data block, and request the first deduplication database computing device to store the signature of the particular data block and a location of the copy of the particular data block, or
based at least in part on an indication from the first deduplication database computing device that the signature of the particular data block resides in the first deduplication database computing device, cause at least one storage device of the one or more storage devices of the secondary storage to store a reference to a copy of the particular data block that is stored in the secondary storage.

8. The system of claim 7, wherein each deduplication database computing device is assigned to store unique signatures of different data blocks.

9. The system of claim 7, wherein the first deduplication database computing device is assigned to store a first set of signatures and the second deduplication database computing device is assigned to store a second set of signatures different from the first set of signatures.

10. The system of claim 7, wherein each deduplication database computing device of the plurality of deduplication database computing devices is identified as a failover deduplication database computing device to another one of the plurality of deduplication database computing devices.

11. The system of claim 7, further comprising a third deduplication database computing device identified as the failover deduplication database computing device for the first deduplication database computing device, wherein the second deduplication database computing device is identified as the failover deduplication database computing device for the third deduplication database computing device.

12. The system of claim 7, wherein the at least one of the plurality of secondary storage computing devices is further configured to calculate a signature of each of the plurality of data blocks using the signature function.

* * * * *

UNITED STATES PATENT AND TRADEMARK OFFICE
CERTIFICATE OF CORRECTION

PATENT NO. : 9,633,033 B2  
APPLICATION NO. : 14/152509  
DATED : April 25, 2017  
INVENTOR(S) : Manoj Kumar Vijayan Page 1 of 1

It is certified that error appears in the above-identified patent and that said Letters Patent is hereby corrected as shown below:

In the Specification

In Column 3 at Line 5, After "agents" insert --.--.

In Column 12 at Line 26, After "limitation" insert --.--.

In Column 33 at Line 21, After "like)" insert --.--.

In Column 33 at Line 36, After "etc.)" insert --.--.

In the Claims

In Column 54 at Line 38, In Claim 1, change "of the of the" to --of the--.

In Column 54 at Line 47, In Claim 1, change "of the of the" to --of the--.

Signed and Sealed this  
Thirty-first Day of October, 2017

Joseph Matal  
*Performing the Functions and Duties of the*  
*Under Secretary of Commerce for Intellectual Property and*  
*Director of the United States Patent and Trademark Office*